US011387764B2

(12) United States Patent
Said et al.

(10) Patent No.: US 11,387,764 B2
(45) Date of Patent: Jul. 12, 2022

(54) MULTI-INVERTER SYSTEM FOR ELECTRIC MACHINE

(71) Applicant: Zunum Aero, Inc., Bothell, WA (US)

(72) Inventors: Waleed Said, Rockford, IL (US); Chenggang Mei, Northbrook, IL (US)

(73) Assignee: Zunum Aero, Inc., Bothell, WA (US)

( * ) Notice: Subject to any disclaimer, the term of this patent is extended or adjusted under 35 U.S.C. 154(b) by 819 days.

(21) Appl. No.: 16/034,276

(22) Filed: Jul. 12, 2018

(65) Prior Publication Data

US 2020/0021229 A1    Jan. 16, 2020

(51) Int. Cl.
| | | |
|---|---|---|
| H02K 27/14 | (2006.01) |
| H02P 27/14 | (2006.01) |
| H02K 11/33 | (2016.01) |
| H02K 1/16 | (2006.01) |
| H02K 3/28 | (2006.01) |
| H02K 3/50 | (2006.01) |
| H02K 11/00 | (2016.01) |

(52) U.S. Cl.
CPC ............ *H02P 27/14* (2013.01); *H02K 1/165* (2013.01); *H02K 3/28* (2013.01); *H02K 3/50* (2013.01); *H02K 11/0094* (2013.01); *H02K 11/33* (2016.01)

(58) Field of Classification Search
CPC ............ H02K 1/16; H02K 1/165; H02K 3/28; H02K 3/50; H02K 11/0094; H02K 11/20; H02K 11/33; H02K 2203/09; H02K 2203/15; H02P 27/14
USPC ................................................. 310/68 D, 71
See application file for complete search history.

(56) References Cited

U.S. PATENT DOCUMENTS

| 3,900,681 | A | * | 8/1975 | Walters ................. H01B 7/292 428/379 |
|---|---|---|---|---|
| 5,640,064 | A | | 6/1997 | Boyd et al. |
| 5,668,429 | A | | 9/1997 | Boyd et al. |
| 5,852,338 | A | | 12/1998 | Boyd et al. |
| 5,894,182 | A | | 4/1999 | Saban et al. |
| 5,911,453 | A | | 6/1999 | Boyd et al. |
| 5,990,588 | A | | 11/1999 | Kliman et al. |
| 6,002,191 | A | | 12/1999 | Saban |
| 6,018,207 | A | | 1/2000 | Saban et al. |
| 6,063,827 | A | | 5/2000 | Sacripante et al. |
| 6,088,905 | A | | 7/2000 | Boyd et al. |
| 6,127,080 | A | | 10/2000 | Sacripante et al. |
| 6,223,417 | B1 | | 5/2001 | Saban et al. |
| 6,324,494 | B1 | | 11/2001 | Saban |

(Continued)

OTHER PUBLICATIONS

U.S. Appl. No. 16/034,265 / Application, Declaration and POA filed Jul. 12, 2018; 88 pages.

(Continued)

*Primary Examiner* — Rashad H Johnson
(74) *Attorney, Agent, or Firm* — Berkeley Law & Technology Group, LLP

(57) ABSTRACT

An electric motor may comprise a rotor and a stator. One or more first cables connected to a first power converter circuit of are wrapped adjacent to at least some stator teeth of a stator core to form at least a first portion of one or more coil windings. One or more second cables connected to a second power converter circuit of the plurality of power converter circuit also may be wrapped adjacent to at least some of the stator teeth to form at least a second portion of the one or more coil windings.

17 Claims, 16 Drawing Sheets

(56) References Cited

U.S. PATENT DOCUMENTS

| | | |
|---|---|---|
| 6,388,356 B1 | 5/2002 | Saban |
| 6,504,337 B1 | 1/2003 | Saban et al. |
| 6,777,847 B1 | 8/2004 | Saban et al. |
| 6,934,666 B2 | 8/2005 | Saban et al. |
| 6,967,461 B1 | 11/2005 | Markunas et al. |
| 7,075,399 B2 | 7/2006 | Saban et al. |
| 7,208,854 B1 | 4/2007 | Saban et al. |
| 7,573,144 B1 | 8/2009 | Saban et al. |
| 7,710,081 B2 | 5/2010 | Saban et al. |
| 7,791,238 B2 | 9/2010 | Pal et al. |
| 7,859,212 B2 | 12/2010 | Pan et al. |
| 7,960,948 B2 | 6/2011 | Saban et al. |
| 8,040,007 B2 | 10/2011 | Petrov et al. |
| 8,154,158 B2 | 4/2012 | Saban et al. |
| 8,179,009 B2 | 5/2012 | Saban |
| 8,183,734 B2 | 5/2012 | Saban et al. |
| 8,237,320 B2 | 8/2012 | Saban et al. |
| 8,247,938 B2 | 8/2012 | Saban et al. |
| 8,253,298 B2 | 8/2012 | Saban et al. |
| 8,310,123 B2 | 11/2012 | Saban et al. |
| 8,350,432 B2 | 1/2013 | Guedes-Pinto et al. |
| 8,415,854 B2 | 4/2013 | Saban et al. |
| 8,421,297 B2 | 4/2013 | Stout et al. |
| 8,456,047 B2 | 6/2013 | Pal et al. |
| 8,901,791 B2 | 12/2014 | Saban et al. |
| 9,670,277 B2 | 6/2017 | Dana et al. |
| 9,918,808 B2 | 3/2018 | Garcia Saban et al. |
| 9,991,772 B2 | 6/2018 | Totaro et al. |
| 2003/0074165 A1 | 4/2003 | Saban et al. |
| 2004/0189429 A1 | 9/2004 | Saban et al. |
| 2007/0018516 A1 | 1/2007 | Pal et al. |
| 2008/0103632 A1 | 5/2008 | Saban et al. |
| 2008/0224551 A1 | 9/2008 | Saban et al. |
| 2008/0238234 A1 | 10/2008 | Saban et al. |
| 2009/0061337 A1 | 3/2009 | Wu et al. |
| 2009/0200809 A1 | 8/2009 | Saban et al. |
| 2009/0218977 A1* | 9/2009 | Pan .................. H02P 27/06 318/445 |
| 2009/0224720 A1* | 9/2009 | Oyobe ................ H02M 1/12 318/801 |
| 2010/0019589 A1 | 1/2010 | Saban et al. |
| 2010/0019590 A1 | 1/2010 | Guedes-Pinto et al. |
| 2010/0019598 A1 | 1/2010 | Saban |
| 2010/0019599 A1 | 1/2010 | Saban |
| 2010/0019600 A1 | 1/2010 | Saban et al. |
| 2010/0019601 A1 | 1/2010 | Saban et al. |
| 2010/0019602 A1 | 1/2010 | Saban et al. |
| 2010/0019603 A1 | 1/2010 | Saban |
| 2010/0019609 A1 | 1/2010 | Stout et al. |
| 2010/0019610 A1 | 1/2010 | Saban et al. |
| 2010/0019613 A1 | 1/2010 | Saban et al. |
| 2010/0019626 A1 | 1/2010 | Stout et al. |
| 2010/0052626 A1* | 3/2010 | Tupper ................ H02P 9/48 322/61 |
| 2010/0171383 A1 | 7/2010 | Petrov et al. |
| 2010/0244599 A1 | 9/2010 | Saban et al. |
| 2010/0289353 A1 | 11/2010 | Pal et al. |
| 2011/0057591 A1* | 3/2011 | Tagome ............... B60L 15/20 318/400.23 |
| 2011/0101906 A1* | 5/2011 | Tagome ............... H02K 11/33 318/722 |
| 2012/0169171 A1 | 7/2012 | Jansen et al. |
| 2013/0093280 A1* | 4/2013 | Savagian et al. ...... H02K 23/26 |
| 2013/0093281 A1* | 4/2013 | Savagian et al. ....... H02K 3/12 |
| 2013/0169097 A1 | 7/2013 | Saban et al. |
| 2013/0169099 A1 | 7/2013 | Saban et al. |
| 2013/0239578 A1 | 9/2013 | Saban et al. |
| 2014/0346904 A1* | 11/2014 | Yoon .................. H02K 1/06 310/46 |
| 2016/0280386 A1 | 9/2016 | Mestler et al. |
| 2017/0040853 A1 | 2/2017 | Totaro |
| 2017/0314353 A1 | 11/2017 | Viassolo et al. |
| 2018/0145547 A1 | 5/2018 | Saban et al. |
| 2018/0145551 A1 | 5/2018 | Stephens et al. |
| 2018/0145572 A1 | 5/2018 | Saban et al. |
| 2018/0145573 A1 | 5/2018 | Saban et al. |
| 2020/0021157 A1 | 1/2020 | Saban et al. |
| 2020/0244127 A1* | 7/2020 | Birkmayer et al. ..... H02K 3/28 |

OTHER PUBLICATIONS

U.S. Appl. No. 16/034,265 / Filing Receipt Aug. 14, 2018; 3 pages.
U.S. Appl. No. 16/034,265 / Notice of Publication Jan. 16, 2020; 1 page.

* cited by examiner

FIG. 7B

Jumper for yellow, A3 : 142 T to 4 B
Jumper for black, B3 : 144 T to 6 B
Jumper for pink, C3 : 2 T to 8 B

MULTI-INVERTER SYSTEM FOR ELECTRIC MACHINE

CROSS-REFERENCE TO RELATED APPLICATIONS

This application is being filed concurrently with U.S. patent application Ser. No. 16/034,265, titled MULTI-FILAR COIL WINDING FOR ELECTRIC MACHINE, assigned to the assignee hereof and incorporated herein by reference in its entirety.

FIELD

This disclosure relates generally to electric machines such as generators and electric motors.

INFORMATION

Electric motors have been proposed as a means for propelling transportation vehicles including fixed-wing aircraft and land vehicles from a battery source. Effectiveness of such electric motors as a means for propelling vehicles may rely, at least in part, on achievable electric motor power densities and reliabilities.

SUMMARY

Briefly, one implementation described herein is directed to a device comprising: a power bus; a rotor; a stator core; a plurality of power converter circuits coupled to the power bus; and a plurality of first cables coupled to a first power converter circuit of the plurality of power converter circuits and wrapped over a first portion of the stator core to form at least a first portion of one or more coil windings; a plurality of second cables coupled to a second power converter circuit of the plurality of power converter circuits and wrapped over a second portion of the stator core to form at least a second portion of the one or more coil windings, the first portion of the stator core and the second portion of the stator overlapping on a first overlapped portion of the stator core, wherein at least one of the first cables and at least one of the second cables are wrapped adjacently over the first overlapped portion of the stator core, and wherein the first power converter circuit is adaptable to provide a first voltage waveform signal to the at least one of the first cables and the second power converter circuit is adaptable to provide a second voltage waveform signal to the at least one of the second cables, the first and second voltage waveform signals being substantially identical.

Another particular implementation is directed to a method comprising: applying a first voltage waveform signal, from a first power converter circuit, to at least one cable of a first plurality of cables connected to the first power converter circuit, the at least one cable of the first plurality of cables being wrapped over a first portion of a stator core to form at least a first portion of one or more coil windings; applying a second voltage waveform signal, from a second power converter circuit, to at least one cable of a second plurality of cables connected to the second power converter circuit, the at least one cable of the second plurality of cables being wrapped over a second portion of a stator core to form at least a second portion of the one or more coil windings, the first and second portions of the stator core overlapping on a first overlapped portion of the stator core, wherein the at least one of the first plurality of cables and the at least one of the second plurality of cables are wrapped together adjacently over the first overlapped portion of the stator core, and wherein the first and second voltage waveform signals are substantially identical.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIG. 7B is a diagram showing a mapping of cables to slots in a stator according to an embodiment;

FIGS. 11 and 12 are diagrams showing mappings of cables to slots in a stator according to alternative embodiments.

Figure 1:
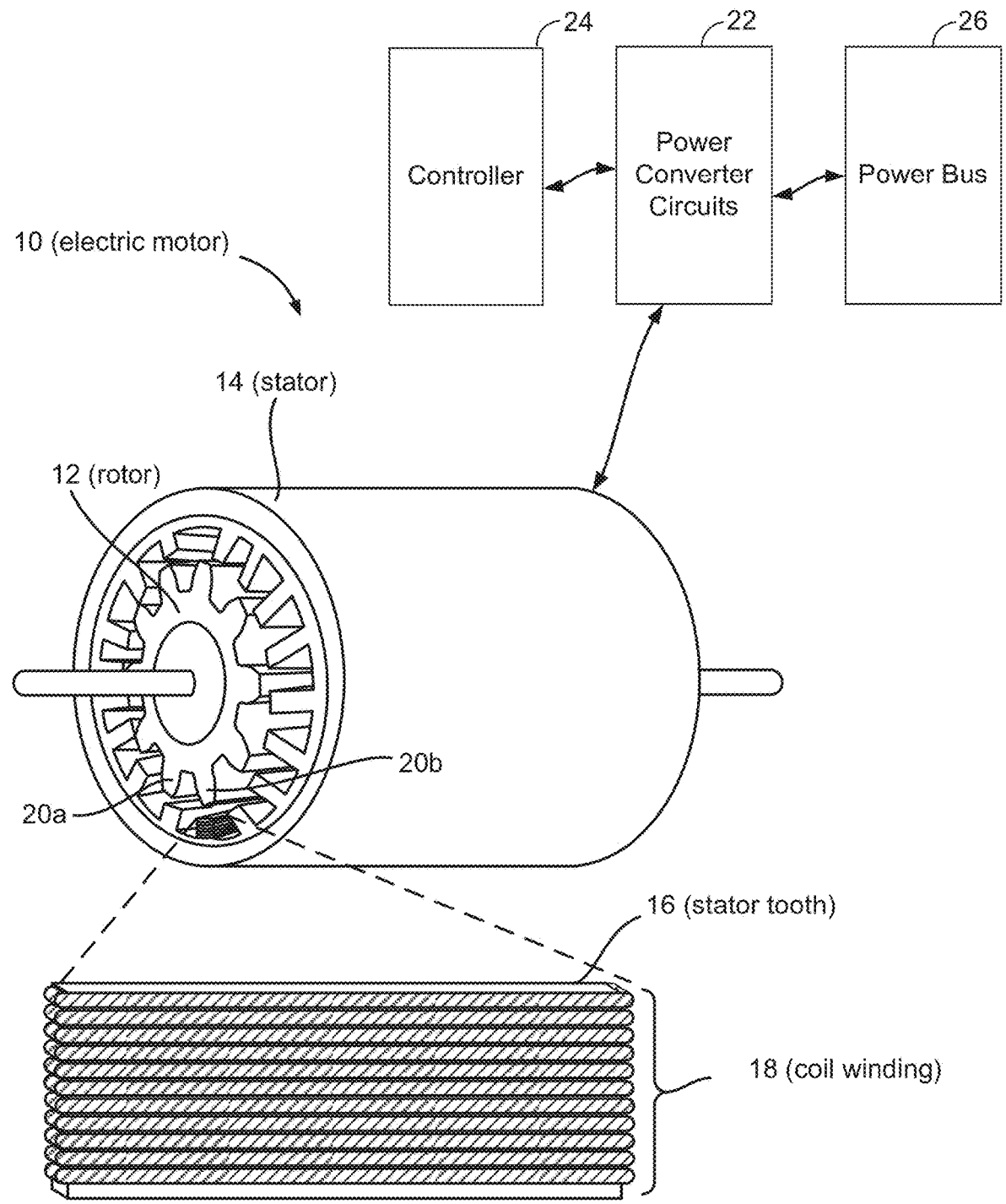
FIG. 1 is a schematic diagram of a motor driven propulsion system according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

According to an embodiment, a transportation vehicle such as fixed-winged aircraft (e.g., a passenger plane) or land-based transportation vehicle may be propelled by electric motors powered by battery energy sources. Cost efficient and reliable use of electric motors may be enabled at least in part by sufficiently high power densities achieved at constrained voltage levels for a power source. For example, to maintain within current safety regulations, a voltage to power electric motors for propelling a fixed wing aircraft may be limited to about 600 volts DC. Furthermore, a fundamental frequency of a voltage waveform signal provided to coil windings of such electric motors may be limited to about 1200 Hz. Additionally, it may be desirable to implement electric motors with sufficient power density to propel fixed-wing passenger aircraft and having fault tolerant characteristics.

Features described herein are directed to implementations of an electric motor. However, it should be understood that such features are not limited to implementations of an electric motor but may be applied more generally to an "electric machine" including specific classes of electric machines such as motors or electric generators, for example.

According to an embodiment, an electric motor driven propulsion system may comprise multiple independently controlled sets of coil windings drawing current from a fixed power source. In an implementation, each set of independently controlled sets of coil windings of a motor driven propulsion system may comprise one or more coil windings formed on a stator to apply a portion of an overall torque to a rotor independently of the other independently controlled sets of coil windings. In an implementation, independently controlling multiple different sets of coil windings in a motor driven propulsion system using multiple associated power converter circuits may enable sufficient overall torque (e.g., applied to propeller thrust) for takeoff while limiting a power source to a relatively low voltage.

In an implementation, if one of the independently controlled sets of coil windings fails or becomes inoperable, remaining operable sets of independently controlled sets of coil windings may provide sufficient torque to enable the motor driven propulsion system to operate in a degraded mode of operation. Such a degraded mode of operation in such a motor driven propulsion system propelling a fixed-wing passenger aircraft may enable the fixed-wing aircraft to safely land.

In another implementation, the aforementioned sets of coil windings may comprise multi-filar coil windings formed from cables having multi-filar conductors. For example, two different coil windings of the same motor phase may be bifilar wound (e.g., in intimate proximity and tracing the same winding path) and each of the two bifilar windings may be fed by a separate interleaved switch set. Multiple bifilar cables may be adjacently wrapped together to a stator core to form coil windings. Power signals supplied to the coil windings may then be separately controlled by different power converter circuits. Here, the different power converter circuits may supply a substantially identical alternating voltage waveform to each of the separately controlled coil windings. While current in each of the bifilar coil windings may have a high ripple at a switching frequency, the high frequency content may be fully out of phase. A resultant flux in the motor may comprise the sum of the resultant flux from the two bifilar windings and the flux due to high frequency switching current from the two interleaved switch sets may substantially cancel. Particular implementations may reduce (or eliminate completely) any need for a filter between coil windings and a power converter circuit, allowing for reduced system weight. In a particular implementation, neutral connections for each of the bifilar windings may be electrically isolated from each other.

FIG. 1 is a schematic diagram of a motor driven propulsion system comprising a rotor and stator combination. A rotor 12 is shown as having a plurality of rotor teeth. In other implementations, a rotor may comprise permanent magnets mounted on a rotor hub surface. A stator 14 may comprise a plurality of stator teeth 16 having coil windings disposed thereon. In a particular implementation, power converter circuits 22 may be coupled to power bus 26 to provide current to coil windings 18 such that that induced magnetic fields apply a torque to rotor 12. According to an embodiment, power converter circuits 22 may supply power signals to coil windings 18 as pulse width modulation (PWM) waveform signals responsive to control signals from controller 24.

Figure 2:
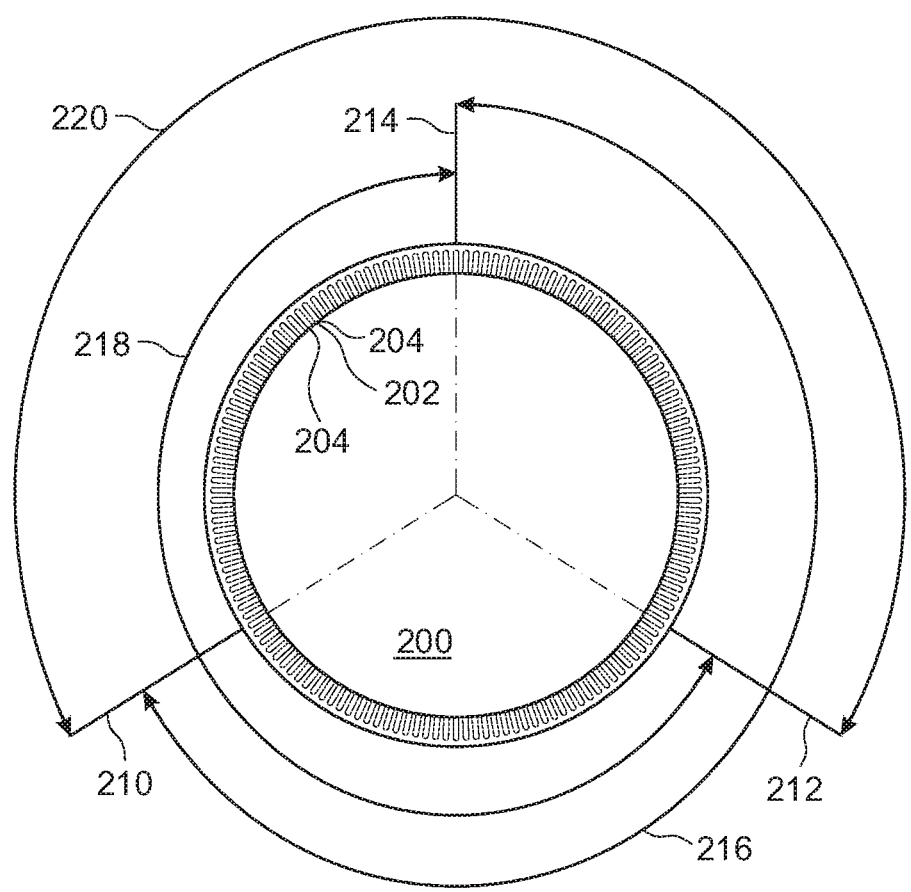
FIG. 2 is a schematic diagram of a stator core according to an embodiment.

FIG. 2 is a schematic diagram of a stator core 200 according to an embodiment. In the particular illustrated embodiment, stator core comprises 144 stator teeth 202 and 144 stator slots 204 separating adjacent stator teeth 202. It should be understood, however that a stator core may have greater than or fewer than 144 teeth (and 144 slots between teeth), and that claimed subject matter is not limited in this respect. According to an embodiment, stator core 200 formed may be formed from any one of several iron alloys such as, for example, iron alloys containing cobalt or nickel. As described below, conductors (not shown) disposed in slots 204 may form stator coils to conduct current that may induce magnetic fields providing torque to rotor. According to an embodiment, stator coils formed on stator core 200 may be partitioned into multiple overlapping portions wherein each portion is provided current from a separate current source such as a power converter circuit. For example, stator core 200 may be partitioned into three 240° portions. A first portion 216 may extend 240° from angle position 210 to angle position 214. A second portion 218 may extend 240° from angle position 212 to angle position 214. A third portion 220 may extend 240° from angle position 210 to angle position 212.

As may be observed, first portion 216 and second portion 218 overlap by about 120° over a first overlapped portion of stator core 200. Likewise, second portion 210 and third portion 220 overlap by about 120° over a second overlapped portion of stator core 200. Similarly, third portion 220 and first portion 216 overlap by about 120° over a third overlapped portion of stator core 200. While the particular implementation of FIG. 2 shows three overlapped portions of stator core 200, it should be understood that stator core 200 may be partitioned into two overlapped portions, or four or more overlapped portions without deviating from claimed subject matter.

Figure 3:
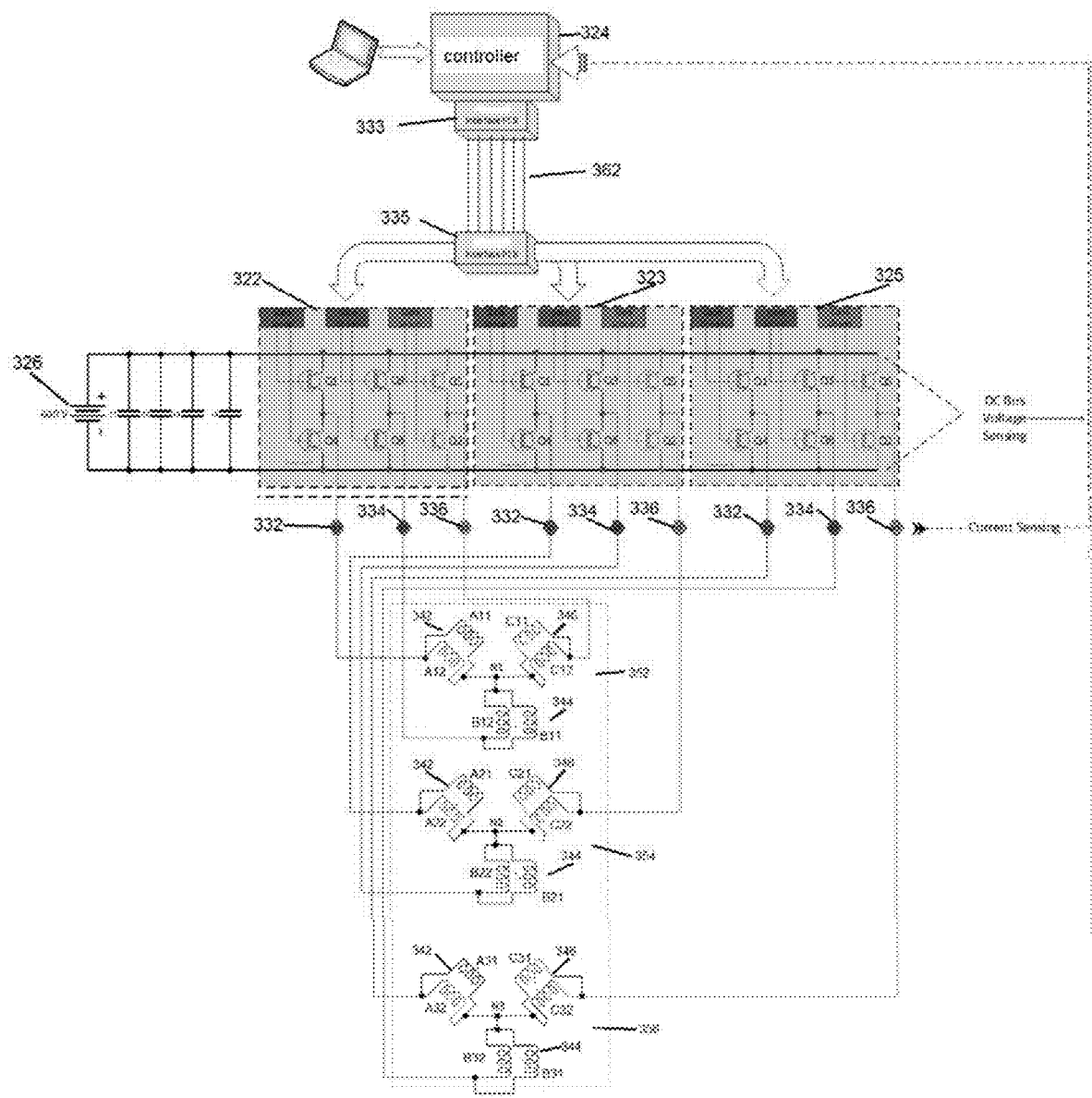
FIG. 3 is a schematic diagram of a motor driven propulsion system comprising multiple independently controlled coil windings according to an embodiment.

FIG. 3 is a schematic diagram of a motor driven propulsion system comprising multiple sets of independently controllable coil windings according to particular embodiments. As pointed out above, a motor driven propulsion system may comprise a rotor and a stator to apply a torque to the rotor responsive to magnetic flux induced by currents in coil windings formed on stator teeth. According to an embodiment, a stator of a motor driven propulsion system may comprise multiple independently controllable segments of coil windings. For example, in the embodiment of FIG. 3, independently controllable coil winding segments may be formed as independently controllable sets of coil windings 352, 354 and 356.

In the particular illustrated embodiments, power signals in coil windings of a particular independently controllable coil winding segment may be provided by one or more independently controllable power converter circuits dedicated to powering the independently controllable coil winding segment. In the implementation of FIG. 3, for example, power converter circuit 322 is dedicated to providing current to set of coil windings 352, power converter circuit 323 is dedicated to providing current to set of coil windings 354 and power converter circuit 325 is dedicated to providing current to set of coil windings 356. As may be observed, power converter circuits 322, 323 and 325 may be independently controllable in that each power converter circuit may be separately controlled by a control signal provided at a control interface of the power converter circuit and receive a power signal (e.g., from a DC power source) at a power interface of the power converter circuit. In an implementation, if one independently controllable power converter circuit becomes defective or inoperable, other independently controllable power converter circuits may operate to provide a voltage waveform signal to an associated coil winding. In a particular implementation, sets of coil windings 352, 354 and 356 may be implemented on associated portions of a stator core. In the particular example of stator core 200, set of coil windings 352 may be implemented over 240° on portion 216, set of coil windings 354 may be implemented over 240° on portion 218 and set of coil windings 356 may be implemented over 240° on portion 220.

In the particular illustrated embodiment of FIG. 3, coil windings 342, 344 and 346 may comprise bifilar windings where a coil winding 342 comprises two isolated conductors (A11 and A12, A21 and A22, or A31 and A32), a coil winding 344 comprises two isolated conductors (B11 and B12, B21 and B22, or B31 and B32) and a coil winding 346 comprises two isolated conductors (C11 and C12, C21 and C22, or C31 and C32).

According to an embodiment, while operating independently, power converter circuits 322, 323 and 325 may be synchronized to supply a substantially identical voltage waveform signals for coil windings 342, 344 and/or 346 across all sets of coil windings 352, 354 and 356. That is, coil windings 342 (A11/A12, A21/A22 and A31/A32 of sets of coil windings 352, 354 and 356 may receive first substantially identical voltage waveform signals, coil windings 344 (B11/B12, B21/B22 and B31/B32) of sets of coil windings 352, 354 and 356 may receive second substantially identical voltage waveform signals, and coil windings 346 (C11 and C12, C21 and C22, or C31 and C32) of sets of coil windings 352, 354 and 356 may receive third substantially identical voltage waveform signals.

According to an embodiment, power converter circuits 322, 323 and 325 may provide voltage waveform signals to coil windings from a common power source. As mentioned above, such a power source may provide a current at a limited voltage level (e.g., 600 V DC). In a particular implementation, a power converter circuit may comprise pairs of switching devices such as insulated-gate bipolar transistors (IGBTs) to intermittently connect a coil winding to the power source to provide a pulse-width modulation (PWM) waveform signal. It should be understood that implementation of IGBTs in the particular implementation of FIG. 3 is merely a particular example of switching devices that may be used to provide a PWM waveform signal, and that other types of switching devices such as metal oxide field effect transistors (MOSFETs) may be similarly implemented without deviating from claimed subject matter. In the particular implementation of FIG. 3, for example, IGBTs Q1 and Q2 of power converter circuit 322 may control a PWM waveform signal provided to a pair of parallel coupled coil windings A11 and A12 of set of coil windings 352. Here, Q1 may be closed while Q4 may be open to connect parallel coupled coil windings A11 and A12 to the power source in a positive polarity, providing a voltage pulse, and Q1 may be open while Q4 is closed to connect parallel coupled coil windings A11 and A12 to the power source in a negative polarity. Pair of IGBTs Q3 and Q6 may similarly control a PWM waveform signal provided to parallel coupled coil windings B11 and B12, and pair of IGBTs Q5 and Q2 may similarly control a PWM waveform signal provided to parallel coupled coil windings C11 and C12. IGBTs Q1 through Q6 may be controlled in such a way that PWM waveform signals to A11 and A12, B11 and B12, and C11 and C12 are symmetrically out-of-phase with respect to each other. A duration that an IGBT Q1, Q2, Q3, Q4, Q5 or Q6 is closed or open may depend, at least in part, on specific desired loads or torques. For example, an effective voltage amplitude may be adjusted for a particular PWM waveform signals having a particular closed duration or particular duty cycle.

According to an embodiment, PWM waveform signals provided by power converter circuits 322, 323 and 325 may be controlled based on signals generated at controller 324. In an embodiment, features of the PWM waveform signals provided by power converter circuits 322, 323 and 325 such as fundamental period, relative phase and any additional intended high frequency components may be determined at controller 324. In a particular implementation, these features may be programmable. For example, controller 324 may comprise one or more microprocessors or microcontrollers configured to execute instructions stored on a non-transitory memory device for generation of control signals applied to power converter circuits 322, 323 and 325. An interface 333 may comprise an electrical-to-optical interface to modulate an optical signal on a fiber optical cable or bus 362. An interface 335 may comprise an optical-to-electrical interface to demodulate the optical signal on fiber optical cable or bus 362, and provide the demodulated signal to power converter circuits 322, 323 and 325 to control generation of PWM waveform signals as discussed above.

According to an embodiment, the motor driven propulsion system of FIG. 3 current sensors 332, 334 and 336, to sense or measure current applied by power converter circuits 322, 323 and 325 to sets of coil windings 352, 354 and 356. Here, measurements of current at current sensors 332, 334 and 336 may be used to further synchronize voltage waveform signals applied to coil windings. For example, measurements of current on coil windings 342 of sets of coil windings 352, 354 and 356 obtained at current sensors 332 may enable controller 324 to synchronize current signals on coil windings 342 of sets of coil windings 352, 354 and 356. For example, a fundamental period of current signals in coil windings 342 of sets of coil windings 352, 354 and 356 (e.g., as shown in FIG. 4D and discussed below) may be synchronized such that a phase between or among fundamental current signals in coil windings 342 of sets of coil windings 352, 354 and 356 is minimized or eliminated entirely. In an example implementation, and as discussed below, voltage waveform signals generated by power converter circuits 322, 323 and 325 may be generated according to, or synchronized by, a single clock signal. Additionally, based on current measurements obtained at current sensors 332, controller 324 may adjust timing of control signals applied to power converter circuits 322, 323 and 325 (e.g., to affect voltage waveform signals applied to coil windings 342 of sets of coil windings 352, 354 and 356) such that a phase between or among fundamental periods of current signals in coil windings 342 of sets of coil windings 352, 354 and 356 is minimized or eliminated entirely. Likewise, based on current measurements obtained current sensors 334, controller 324 may adjust timing of control signals applied to power converter circuits 322, 323 and 325 (e.g., to affect voltage waveform signals applied to coil windings 344 of sets of coil windings 352, 354 and 356) such that a phase between or among fundamental periods of current signals in coil windings 344 of sets of coil windings 352, 354 and 356 is minimized or eliminated entirely. Similarly, based on current measurements obtained current sensors 336, controller 324 may adjust timing of control signals applied to power converter circuits 322, 323 and 325 (e.g., to affect voltage waveform signals applied to coil windings 346 of sets of coil windings 352, 354 and 356) such that a phase between or among fundamental periods of current signals in coil windings 346 of sets of coil windings 352, 354 and 356 is minimized or eliminated entirely.

Figure 4A:
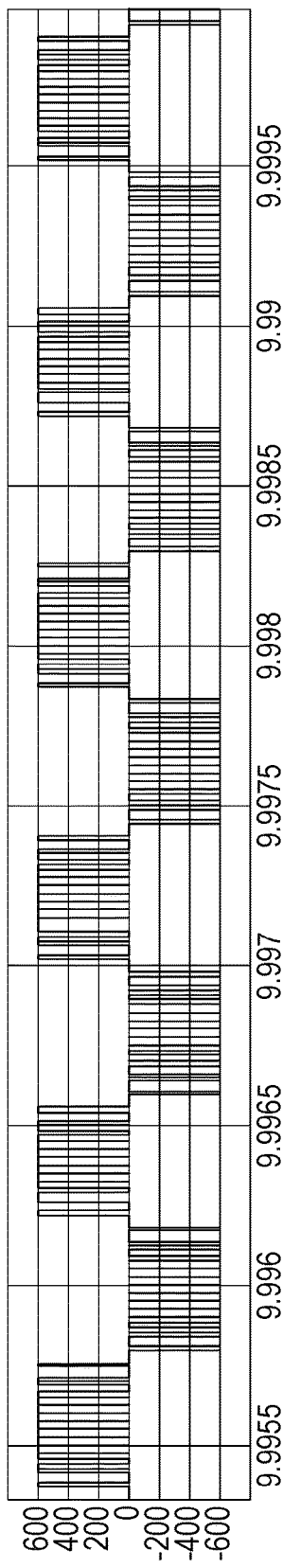
FIGS. 4A, 4B and 4C are plots of voltage waveform signals applied to stator coil windings according to an embodiment.
Figure 4B:
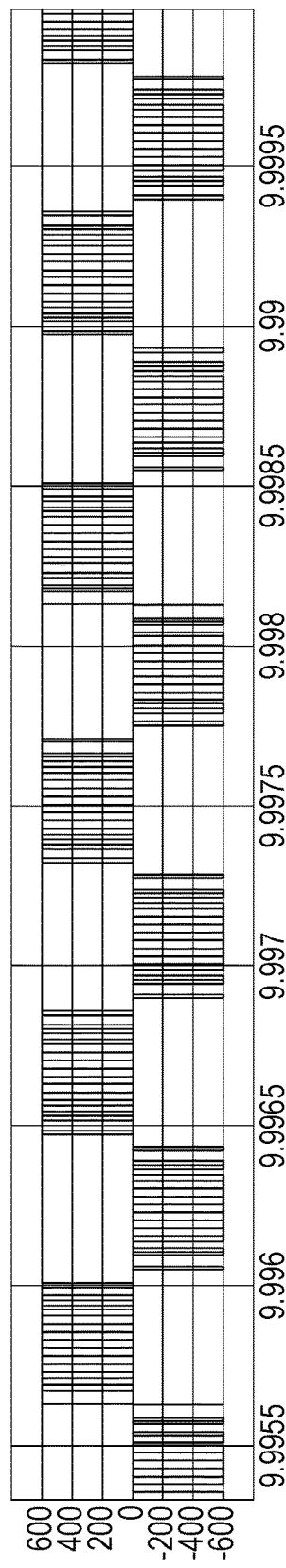
Figure 4C:
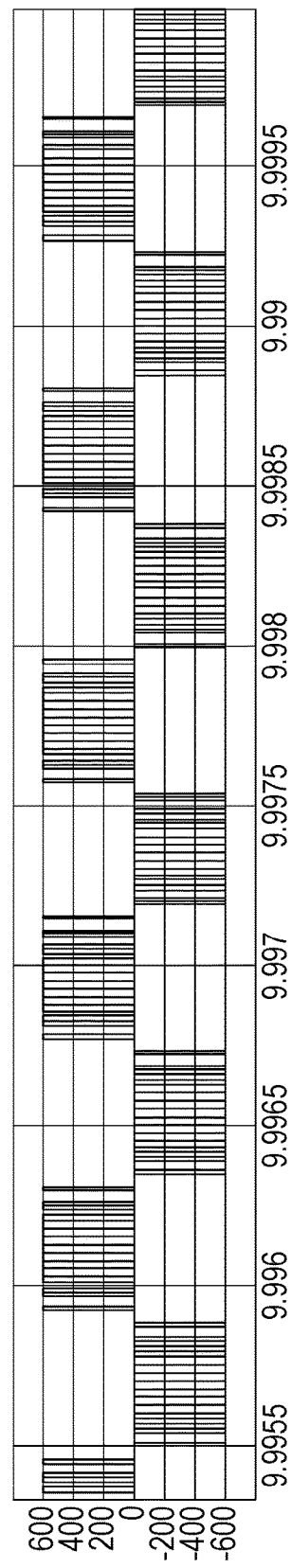
Figure 4D:
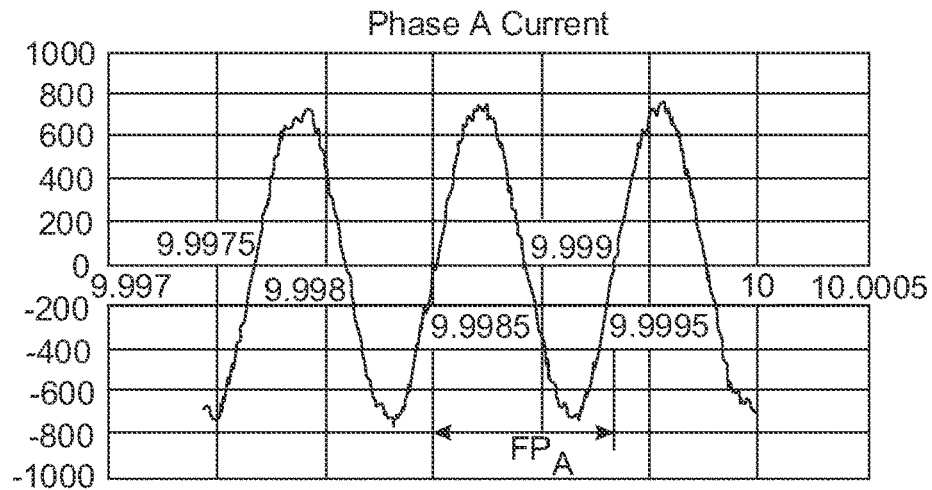
FIGS. 4D, 4E and 4F are plots of current signals in stator coil windings responsive to application of voltage waveform signals according to an embodiment.

FIG. 4A comprises a plot of a voltage waveform signal that may be applied to stator coil windings in a first motor phase (e.g., applied to coil windings A11/A12 of set of coil windings 352, applied to coil windings A21/A22 of set of coil windings 354 and applied to coil windings A31/A32 of set of coil windings 356) as a first voltage waveform signal. FIG. 4B comprises a plot of a voltage waveform signal that may be applied to stator coil windings in a second motor phase (e.g., applied to coil windings B11/B12 of set of coil windings 352, B21/B22 of set of coil windings 354 and B31/B32 of set of coil windings 356) as a second voltage waveform signal. FIG. 4C comprises a plot of a voltage waveform that may be applied to stator coil windings in a third motor phase (e.g., applied to coil windings C11C12 of set of coil windings 352, C21/C22 of set of coil windings 354 and C31/C32 of set of coil windings 356) as a third voltage waveform signal. In a particular implementation, the voltage waveform signals plotted in FIGS. 4A, 4B and 4C may comprise waveform signals generated by independently controllable power converter circuits 322, 323 and 325 responsive to control signals originating at controller 324. For example, the voltage waveform signal plotted in FIG. 4A may be applied between windings A11/A12 and B11/B12 (or between windings A21/A22 and B21/B22, or between windings A31/A32 and B31/B32) by switching IGBTs Q1, Q3 Q4 and Q6. Similarly, the voltage waveform signal plotted in FIG. 4B may be applied between windings B11/B12 and C11/C12 (or between windings B21/B22 and C21/C22, or between windings B31/B32 and C31/C32) by IGBTs Q2, Q3, Q5 and Q6. Likewise, the voltage waveform signal plotted in FIG. 4C may be applied between windings C11/C12 and A11/A12 (or between windings C21/C22 and A21/A22, or between windings C31/C32 and A31/A32) by switching Q1, Q2, Q4 and Q5.

According to an embodiment, power converter circuits 322, 323 and 325 may be configured to generate voltage waveform signals in FIGS. 4A, 4B and 4C as PWM waveform signals substantially identically responsive to timing signals provided on optical bus 362 and generated at controller 324. For example, controller 324 may generate such timing signals based on a single clock signal maintained at controller 324. As such, power converter circuits 322, 323 and 325 may apply substantially identical voltage waveform signals according to FIG. 4A to coil windings 342 of sets of coil windings 352, 354 and 356, respectively. Similarly, power converter circuits 322, 323 and 325 may apply substantially identical voltage waveform signals according to FIG. 4B to coil windings 344 of sets of coil windings 352, 354 and 356, respectively. Likewise, power converter circuits 322, 323 and 325 may apply substantially identical voltage waveform signals according to FIG. 4C to coil windings 346 of sets of coil windings 352, 354 and 356, respectively. In this context, substantially identical voltage waveform signals may comprise one or more substantially identical attributes. For example, substantially identical voltage waveform signals may bring about substantially identical responses if applied to corresponding coil windings. In an implementation, substantially identical voltage waveform signals may comprise PWM waveforms signals having substantially identical fundamental frequency, phase and/or voltage levels of PWM waveform signals shown in FIG. 4A, 4B or 4C. It should be understood, however, that these are merely examples of substantially identical attributes of substantially identical voltage waveform signals, and claimed subject matter is not limited in this respect.

As shown, the voltage waveform signals of FIGS. 4A, 4B and 4C oscillate between −600 V and +600 V. It should be understood, however, that this is merely an example range of a voltage to be applied to stator coil windings in a particular implementation, and that claimed subject matter is not limited in this respect. The voltage waveform signals of FIGS. 4A, 4B and 4C may comprise alternating pulse width modulation (PWM) envelopes oscillating out of phase at a fundamental frequency of about 1200 Hz. It should be understood, however, that this is merely an example fundamental frequency of a PWM waveform signal to be applied to stator coil windings in a particular implementation, and that claimed subject matter is not limited in this respect. As shown, the PWM waveform signals between Q1 and Q4, Q3 and Q6, and Q5 and Q2 may be modulated with dead time to prevent "shoot through." For example, dead time may be inserted after IGBT Q4 (or IGBT Q6 or Q2) is turned off and before IGBT Q1 (or IGBT Q3 or Q5) is turned on. Similarly, dead time may be inserted after Q1 (or Q3 or Q5) is turned off and before Q4 (or Q6 or Q3) is turned on.

Figure 4E:
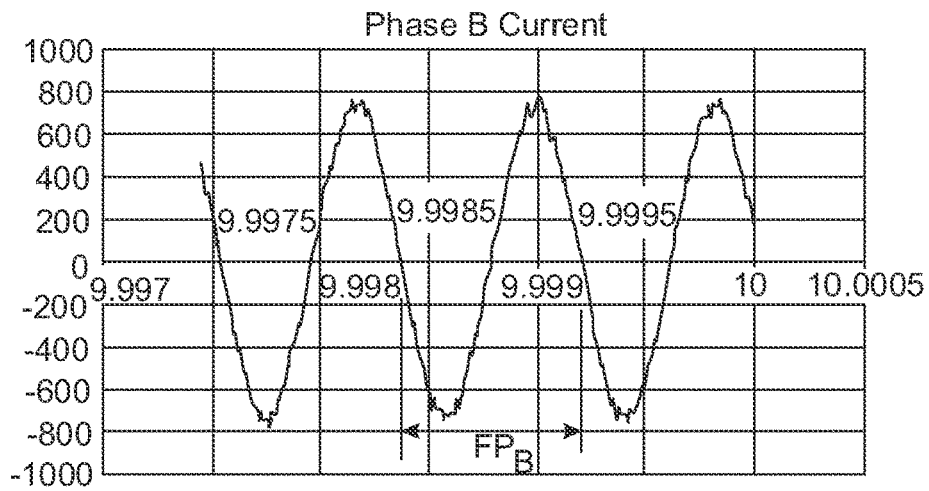
Figure 4F:
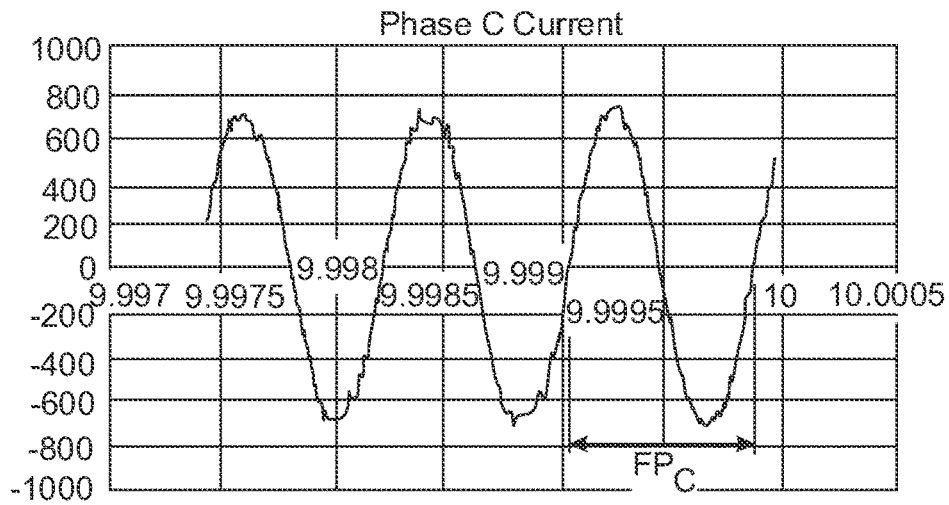

FIGS. 4D, 4E and 4F are plots of current signals in coil windings responsive to application of voltage waveform signal. For example, plots of current shown in FIGS. 4D, 4E and 4F may illustrate current in coil windings coil windings 342 (A11/A12, A21/A22 or A31/A32), 344 (B11/B12, B21/B22 or B31/B32) and 346 (C11/C12, C21/C22 or C31/C32) responsive to application of voltage waveform signals plotted in FIGS. 4A, 4B and 4C, respectively. Changes in current in stator coil windings as shown in FIGS. 4D, 4E and 4F may induce a magnetic flux applying a torque to a rotor as discussed above. As may be observed from FIGS. 4D, 4E and 4F, a current signal in a coil winding may comprise a sinusoidal signal having a fundamental period (with additional high frequency components as manifested in a jagged contour). For example, the current signal of FIG. 4D comprises a fundamental period $FP_A$, the current signal of FIG. 4E comprises a fundamental period $FP_B$ and the current signal of FIG. 4D comprises a fundamental period $FP_C$.

As pointed out above, timing of voltage signals shown in FIG. 4A provided by different power converter circuits 322, 323 and 325 may be controlled by controller 324 (e.g., based, on current measured at current sensors 332, 334 and 336) such that fundamental periods of current signals of FIG. 4D in coil windings 342 of sets of coil windings 352, 354 and 356 may be synchronized. This may be particularly advantageous in response to changes in a voltage waveform signal (e.g., changes in duty cycle, frequency or peak voltage level) to bring about a corresponding change in load or torque. For example, controller 324 may control timing of voltage waveform signals (as shown in FIG. 4A) provided by different power converter circuits 322, 323 and 325 such that a difference in phase of fundamental periods in current signals (e.g., $FP_A$ as shown in FIG. 4D) between or among coil windings 342 of sets of coil windings 352, 354 and 356 is minimized or eliminated. Similarly, controller 324 may control timing of voltage waveform signals (as shown in FIG. 4B) provided by different power converter circuits 322, 323 and 325 such that a difference in phase of fundamental periods in current signals (e.g., $FP_B$ as shown in FIG. 4E) between or among coil windings 344 of sets of coil windings 352, 354 and 356 is minimized or eliminated. Likewise, controller 324 may control timing of voltage waveform signals (as shown in FIG. 4C) provided by different power converter circuits 322, 323 and 325 such that a difference in phase of fundamental periods in current signals (e.g., $FP_C$ as shown in FIG. 4F) between or among coil windings 346 of sets of coil windings 352, 354 and 356 is minimized or eliminated.

Figure 5A:
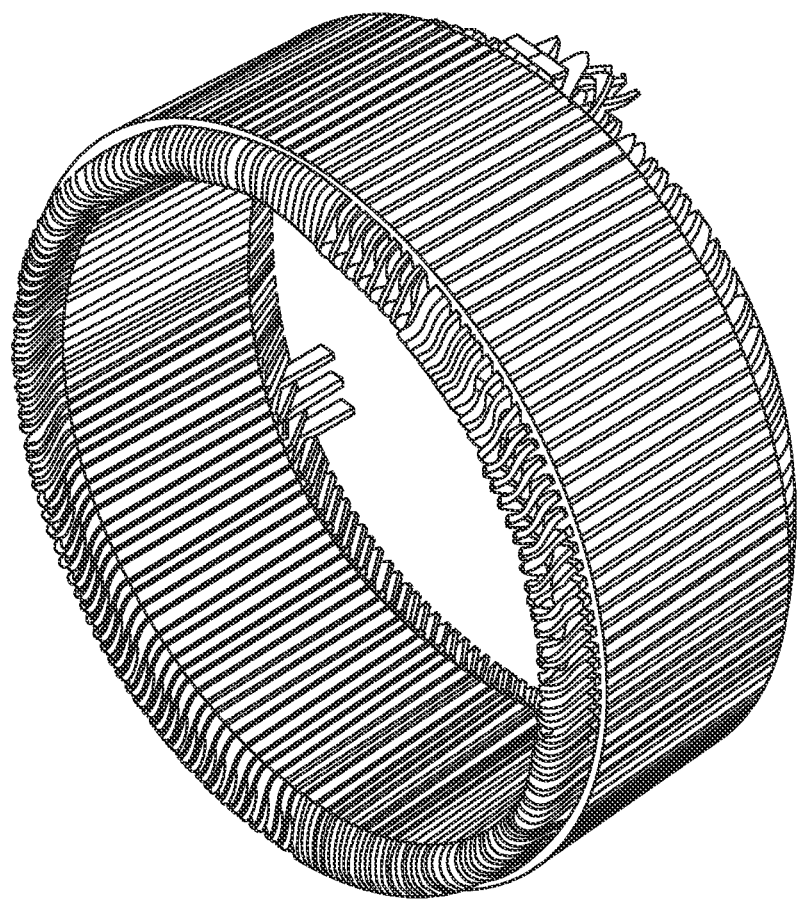
FIG. 5A is a diagram of a stator comprising coil windings according to an embodiment.

FIG. 5A shows a stator comprising a stator core (such as stator core 200 shown in FIG. 2) and coil windings formed by conductors disposed in slots between adjacent teeth of the stator core (e.g., in slots 204). As pointed out above, conductors disposed in the slots may form bifilar coil windings. For example, a coil winding 342, 344 or 346 may be implemented as a cable having two parallel conductors (e.g., a first conductor to implement A11, A21 or A31, and a second conductor to implement A12, A22 or A32, a first conductor to implement B11, B21 or B31, and a second conductor to implement B12, B22 or B32, or a first conductor to implement C11, C21 or C31 and a second conductor to implement C12, C22 or C32).

In an embodiment, a slot may receive (or be allocated) two cables, one cable from two different independently controllable power converter circuits having the same phase. For example, a slot may receive a first cable connected to power converter circuit 322 for phase A11/A12 (e.g., of coil winding 342 of set of coil windings 352) and a second cable connected power converter circuit 323 also for phase A21/A22 (e.g., of coil winding 342 of set of coil windings 354). Similarly, a slot may receive a first cable connected to power converter circuit 322 for phase B11/B12 (e.g., of coil winding 344 of set of coil windings 352) and a second cable connected power converter circuit 325 also for phase B31/B32 (e.g., of coil winding 344 of set of coil windings 356). Likewise, a slot may receive a first cable connected to power converter circuit 323 for phase C11/C12 (e.g., of coil winding 346 of set of coil windings 352) and a second cable connected power converter circuit 325 also for phase C31/C32 (e.g., of coil winding 346 of set of coil windings 356). Current signals in two cables in a slot connected to different independently operating power converter circuits may have fundamental periods at the same phase (e.g., both at phase AX1/AX2 as shown in FIG. 4D, BX1/BX2 as shown in FIG. 4E or CX1/CX2 as shown in FIG. 4F) to induce a combined magnetic field contributing to torque on a rotor.

Figure 5B:
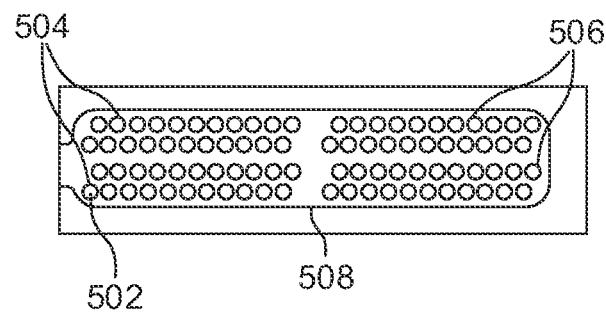
FIG. 5B is a cross-section view of a portion of a winding disposed in a slot of a stator core according to an embodiment.

FIG. 5B is a diagram of conductors disposed in a slot of a stator core (e.g., a slot 204 of stator core 200). Here, a first cable connected to a first power converter circuit comprises two isolated conductors 504 while a second cable connected to a second power converter circuit operating independently of the first power converter circuit comprises two isolated conductors 506. According to an embodiment, conductors 504 and 506 may each comprise multiple copper strands bundled to form conductors. For example, a single conductor 504 or a single conductor 506 may comprise twenty-one strands 508 bundled as a single conductor according to 20 AWG.

In an implementation, the first and second cables may be installed in the slot in a particular order such that a first installed/wrapped cable may occupy a "bottom" portion of the slot while a second, subsequently installed/wrapped cable (e.g., installed/wrapped over the first installed cable) may occupy a "top" portion of the slot. For example, as illustrated in FIG. 5B, a first cable comprising two conductors 504 may occupy such a bottom portion of a slot and a second cable comprising two conductors 506 may occupy a top portion of the slot. As may be observed, two cables occupying top and bottom portions of a slot of a stator core may be, in effect, wrapped together adjacently on a portion of the stator core. Here, for example, first and second cables occupying the top and bottom portions may be physical touching while conductors in the first and second cables may remain electrically isolated from one another. It should be understood, however, that placement of first and second cables in top and bottom portions of a stator slot is merely an example, of how the first and second cables may be wrapped together adjacently to a portion of a stator core, and claimed subject matter is not limited in this respect. Again, as pointed out above, while the first and second cables may be connected to different independently controllable power converter circuits, current provided to conductors 504 and 506 in the first and second cables may be in the same phase AX1/AX2, BX1/BX2 or CX1/CX2.

According to an embodiment, multiple conductors 504 in a first cable and multiple conductors in a second cable, where the first and second cables are wrapped together over selected slots in a stator core, may provide multiple bifilar coil windings. As pointed out above, different bifilar coil windings formed by conductors 504 and 506 may be adjacently wrapped together in slots between teeth of a stator core and separately controlled by different independently controllable power converter circuits (e.g., different power converter circuits 322 and 323) supplying a substantially identical alternating voltage waveform signal (e.g., as shown in FIG. 4A, 4B or 4C) to each of the separately controlled bifilar coil windings. While the different power converter circuits may introduce a high ripple at a switching frequency, the high frequency content is fully out of phase. A resultant flux provided by bifilar coil windings formed by conductors 504 and 506 may comprise a sum of the resultant flux from the two bifilar windings, and the flux due to high frequency switching current from the two interleaved switch legs (e.g., from providing the same alternating voltage waveform signal to each coil winding from different isolated and independently controllable power converter circuits) may substantially cancel. As discussed above, this may obviate any need for disposing a filter between power converter circuits and coil windings to remove high frequency switching current. According to an embodiment, neutral connections for each of the bifilar windings formed by conductors 504 and 506 may be electrically isolated from each other.

The particular implementation of FIG. 5B shows two electrically isolated conductors 504 or 506 for a single cable as an example implementation. Other embodiments may comprise coil windings formed from cables comprising three or more electrically isolated conductors to more generally comprise "multi-filar" windings, and that claimed subject matter is not limited to coil windings formed from cables with only two isolated conductors.

Figure 6:
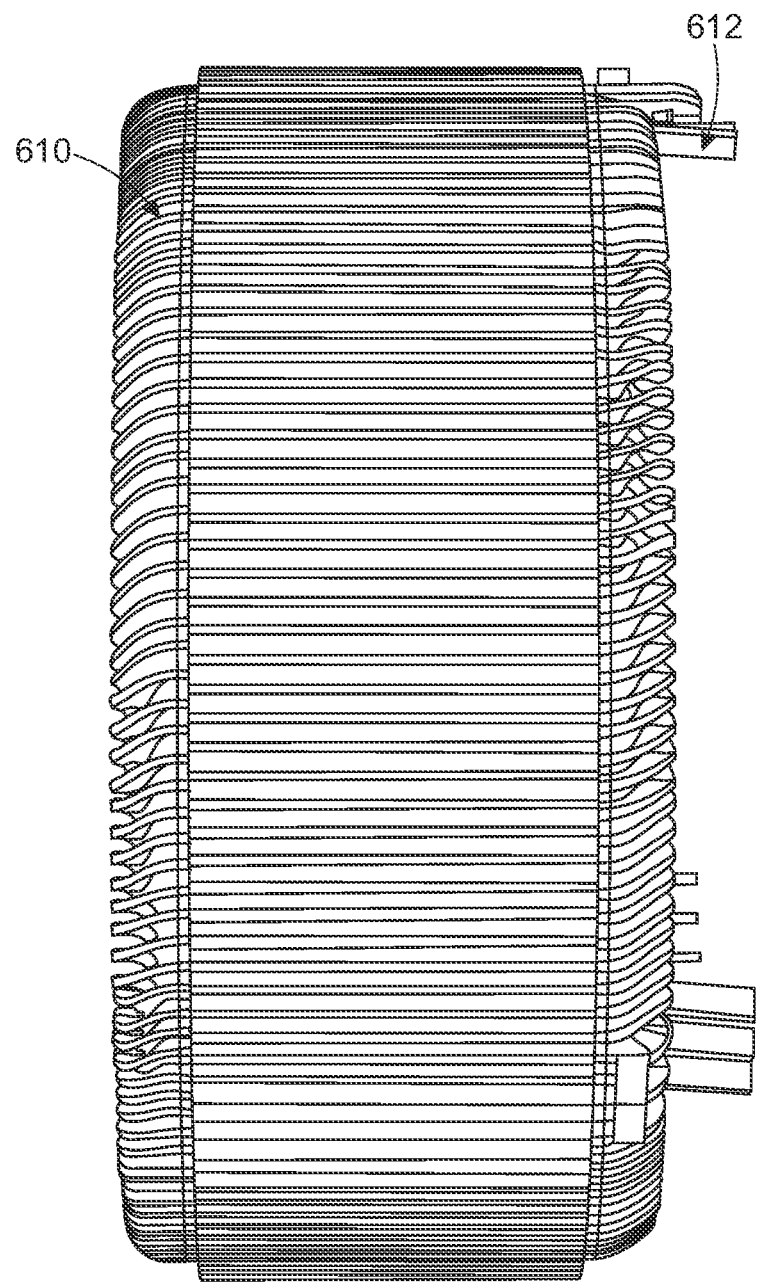
FIG. 6 is a side view of a stator according to an embodiment.

As shown in the particular implementation of FIG. 6, a cable connected to a power converter circuit may be continuously wrapped through multiple different slots. In an example, and as discussed above in connection with FIG. 5B, a cable may occupy a top or bottom portion of a slot. A cable wrapping between two predetermined stator slots may form a non-lead end 610. A cable extending from a stator slot to connect with a power converter circuit (e.g., to provide a current signal to the cable) may form a lead end 612.

Figure 7A:
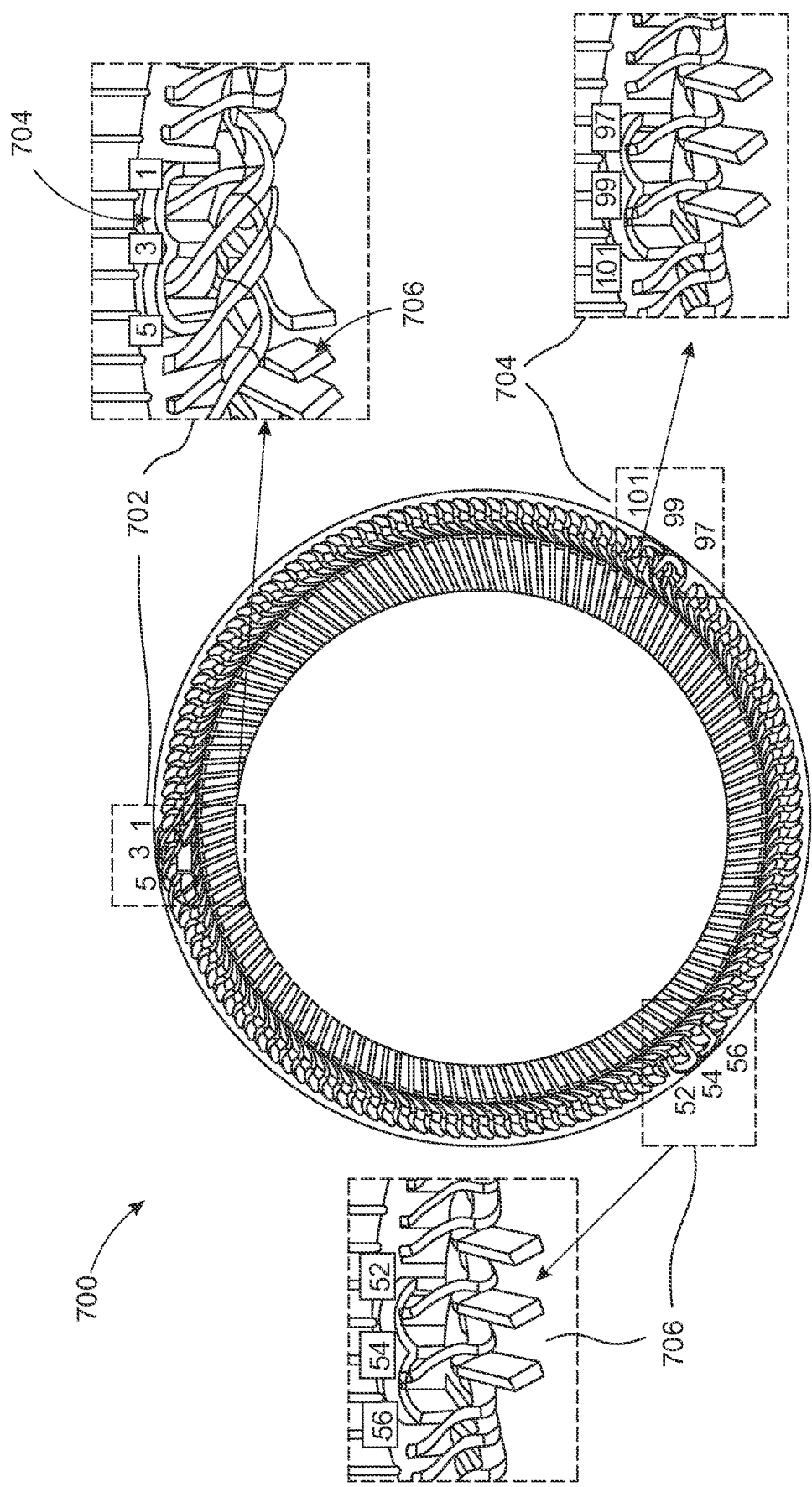
FIG. 7A is a side view of a stator illustrating an ordering of cables disposed in slots of the stator according to an embodiment.
Figure 7B:
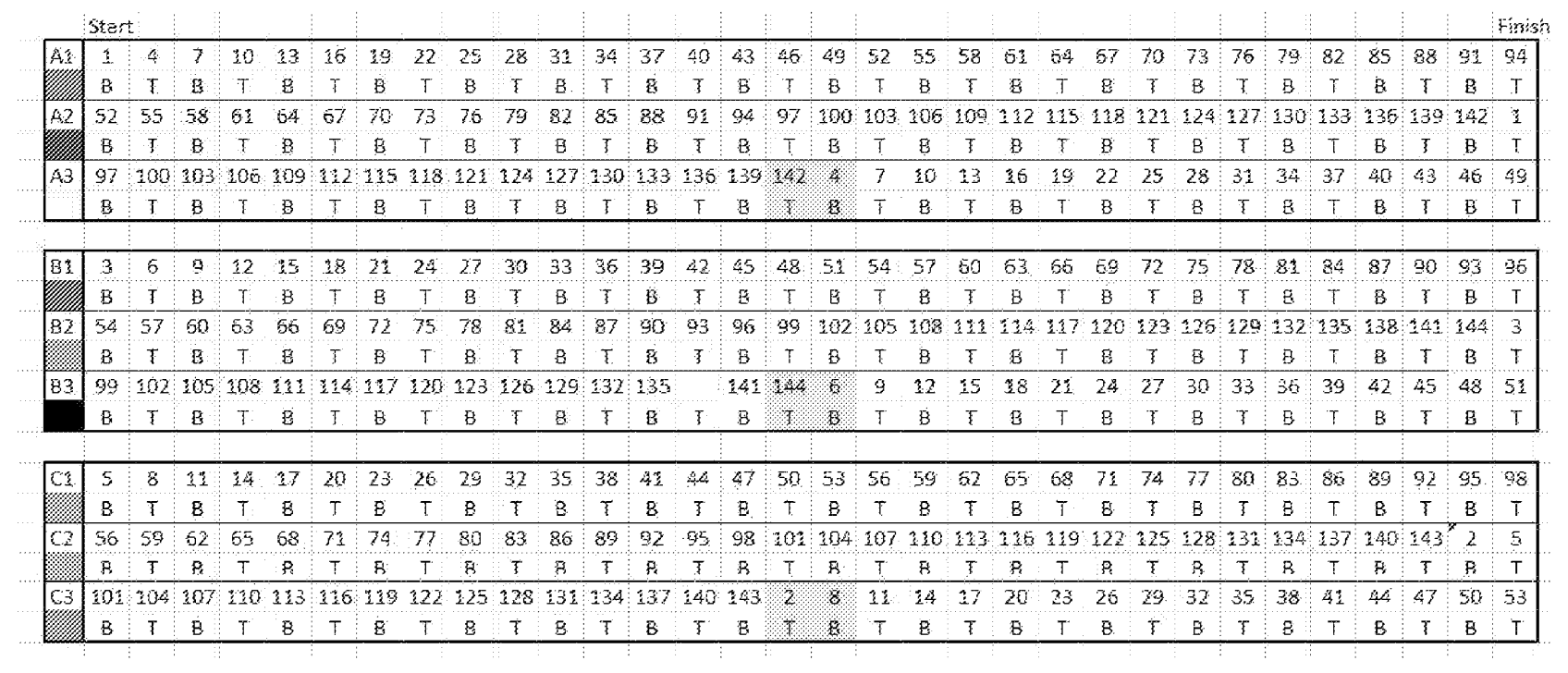

FIGS. 7A and 7B illustrate an allocation of cables to stator slots to form coil windings according to an embodiment. Stator 700 may comprise a stator core (such as stator core 200) and cables disposed in (e.g., wrapped through) top and bottom portions of stator core slots between adjacent stator teeth. For example, stator 700 may comprise 144 slots capable of receiving cables in bottom and top portions as discussed above. In the particular illustrated implementation, nine cables may be disposed in predetermined top and bottom portions of the 144 slots according to a mapping shown in FIG. 7B to form coil windings in stator 700. For example, cables A1, B1 and C1 may be connected to a first independently controllable power converter circuit (e.g., power converter circuit 322), cables A2, B2 and C2 may be connected to a second independently controllable power converter circuit (e.g., power converter circuit 323) and cables A3, B3 and C3 may be connected to a third independently controllable power converter circuit (e.g., power converter circuit 325). Also as discussed above, cables A1, A2, A3, B1, B2, B3, C1, C2 and C3 may comprise two conductors each such that coil windings in stator 700 are formed as bifilar coil windings. For example, cables A1, B1 and C1 disposed in stator slots may form bifilar coil windings A11/A12, B11/B12 and C11/C12, respectively, of set of coil windings 352 (connected to power converter circuit 322), respectively. Likewise, A2, B2 and C2 disposed in stator slots may form bifilar coil windings A21/A22, B21/B22 and C21/C22, respectively, of set of coil windings 354 (connected to power converter circuit 323), respectively. Similarly, A3, B3 and C3 disposed in stator slots may form bifilar coil windings A31/A32, B31/B32 and C31/C32, respectively, of set of coil windings 356 (connected to power converter circuit 325), respectively. In other embodiments (as discussed above and not shown), cables A1, B1 and C1 disposed in stator slots may form multi-filar coil windings where each cable comprises three or more isolated conductors.

In a particular implementation, cables A1, B1 and C1 may be disposed in stator slots according to the mapping of FIG. 7B to form associated bifilar coil windings over a predetermined portion of stator 700 such as a first 240° portion (e.g., 240° portion 216). Similarly, cables A2, B2 and C2 may be disposed in stator slots to form associated bifilar coil windings over a predetermined portion of stator 700 such as a second 240° portion (e.g., 240° portion 218). Also, cables A3, B3 and C3 may be disposed in stator slots to form associated bifilar coil windings over a predetermined portion of stator 700 such as a third 240° portion (e.g., 240° portion 220).

Slots in stator 700 may be sequentially numbered from 1 to 144 in counterclockwise fashion. The mapping of FIG. 7B may define how cables A1, A2, A3, B1, B2, B3, C1, C2 and C3 are to be allocated to or disposed in top and bottom portions of slots 1 through 144. As may be observed and discussed above, top and bottom portions of a slot may be occupied by two cables of the same phase. For example, a top portion of slot 1 is occupied by cable A1 and a bottom of slot 1 is occupied by cable A2 to provide a combined magnetic flux responsive to current shown in FIG. 4D in cable A1 and cable A2. Similarly, a bottom portion of cable slot 3 is occupied by cable B1 and a top portion of slot 3 is occupied by cable B2 provide a combined magnetic flux responsive to current shown in FIG. 4E in cable B1 and cable B2.

According to an embodiment, power converter circuit 322, power converter circuits 323 and 325 may each may independently control three motor phases of stator coil windings. For example, a first phase may be implemented, for example, as coil windings from cables A1, A2 and A3 for a first motor phase, coil windings from cables B1, B2 and B3 for a second motor phase, and coil windings from cables C1, C2 and C3 for a third motor phase. A combined magnetic flux from all nine coil windings (three coil windings per phase) may contribute to an overall torque on a rotor. If one independently controllable power converter circuit is inoperative disabling three associated coil windings, the motor may continue to operate in a degraded mode as a three-phase motor with two remaining independently controllable power converter circuits and six associated remaining coil windings. Here, a combined magnetic flux from the six remaining coil windings may supply sufficient torque to the rotor for the motor to operate in the degraded mode.

Figure 7C:
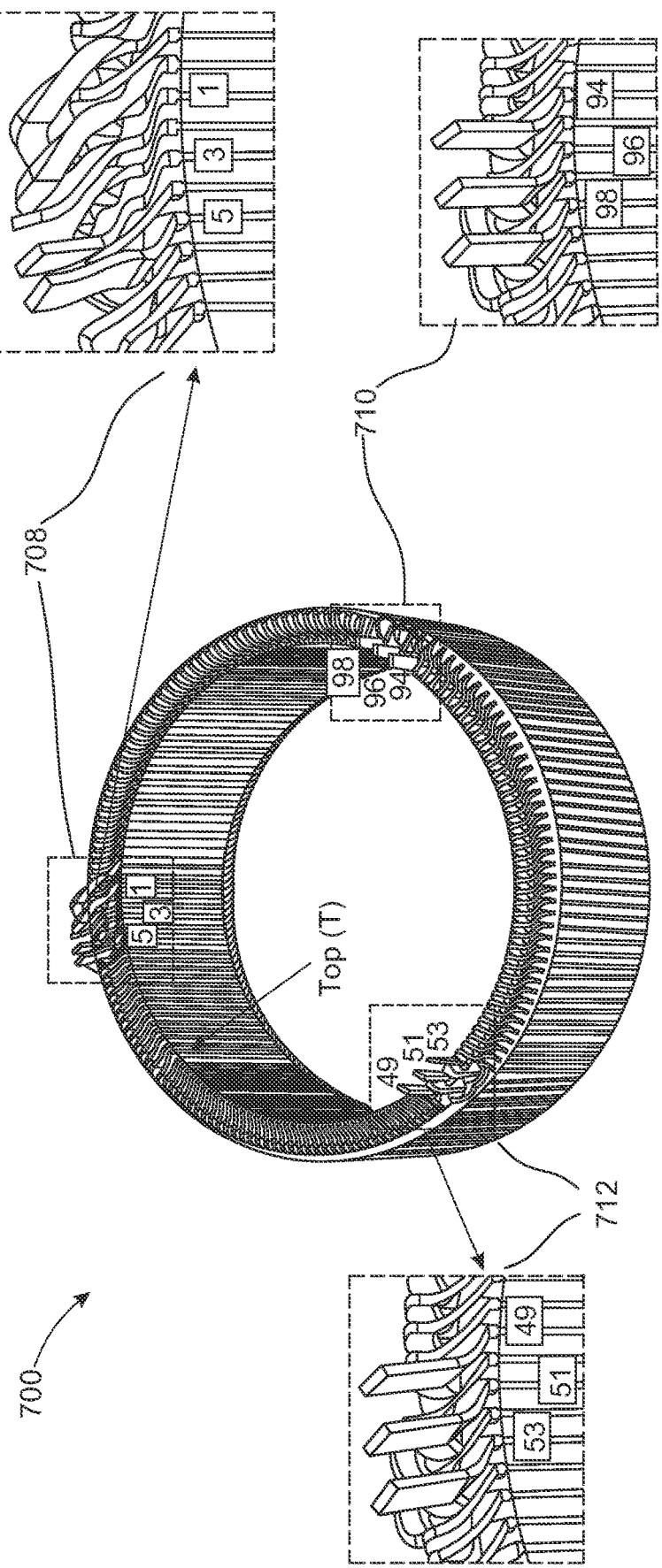
FIG. 7C is a diagram showing a detail of conductors at a finish termination according to an embodiment.

To cover the first 240° portion of stator 700, cables A1, B1 and C1 may have starting positions on stator 700 of slots 1, 3 and 5 (see detail 702 of FIG. 7A), respectively, and have ending positions on stator 700 of slots 94, 96 and 98 (see detail 710 of FIG. 7C), respectively. To cover the second 240° portion of stator 700, cables A2, B2 and C2 may have starting positions on stator 700 of slots 52, 54 and 56 (see detail 706 of FIG. 7A), respectively, and have ending positions on stator 700 of slots 5, 3 and 1 (see detail 708 of FIG. 7C), respectively. To cover the third 240° portion of stator 700, cables A3, B3 and C3 may have starting positions on stator 700 of slots 97, 99 and 101 (see detail 704 of FIG. 7A), respectively, and have ending positions on stator 700 of slots 49, 51 and 53 (see detail 712 of FIG. 7C), respectively. A neutral connection 708 is provided for cables A1, B1 and C1 at slots 1, 3 and 5, respectively. Similarly, a neutral connection 710 is provided for cables A2, B2 and C2 at slots 52, 54 and 56, respectively. Likewise, a neutral connection 712 is provided for cables A3, B3 and C3 at slots 97, 99 and 101, respectively. According to an embodiment, neutral connections 708, 710 and 712 may implement neutral nodes N1, N2 and N3 (FIG. 3), respectively.

As may be observed from FIG. 7B, from starting slots, cables A1, A2, A3, B1, B2, B3, C1, C2 and C3 may be wrapped through slots of stator 700 over associated 240° portions every third slot, alternating between occupying a top portion (identified by "T" underneath an associated slot number) of a slot and a bottom portion (identified by "B" underneath an associated slot number) of a slot. For example, cable A1 starting at occupying a bottom portion of slot 1, will occupy a top portion of slot 4, then a bottom portion of slot 7, and so on until terminating in a top portion of slot 94. Cables A2, B1, B2, C1 and C2 similarly traverse associated 240° portions. While cables A3, B3 and C3 are wrapped over most of the third 240° portion of stator 700 in similar fashion every third slot, alternating between occupying a top portion of a slot and a bottom portion of a slot, this pattern may be interrupted as cables A3, B3 and C3 near a transition 802 between slot 144 and slot 1 shown in FIG. 8. Near transition 802, cables A3, B3 and C3 skip over an additional three slots or a total of six slots. For example, cable A3 occupies a top portion of slot 142 followed by a bottom portion of slot 4 at 810, cable B3 occupies top portion of slot 144 followed by a bottom portion of slot 6 at 812 and cable C3 occupies a top portion of slot 2 followed by a bottom portion of slot 8 at 814.

Figure 9A:
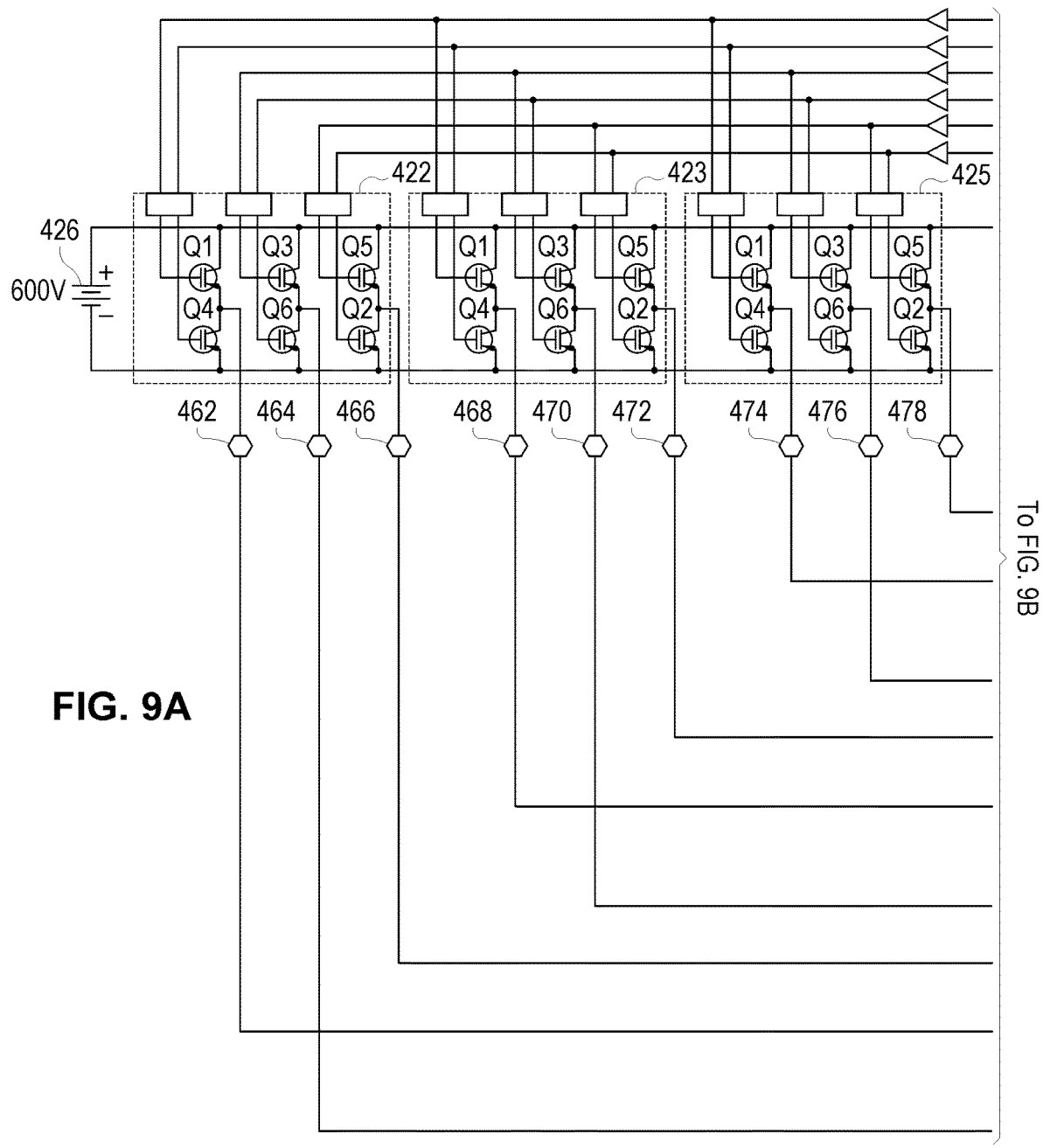
FIGS. 9A, 9B, 10A and 10B are schematic diagrams of a motor driven propulsion system comprising multiple independently controlled coil windings according to an alternative embodiment.
Figure 9B:
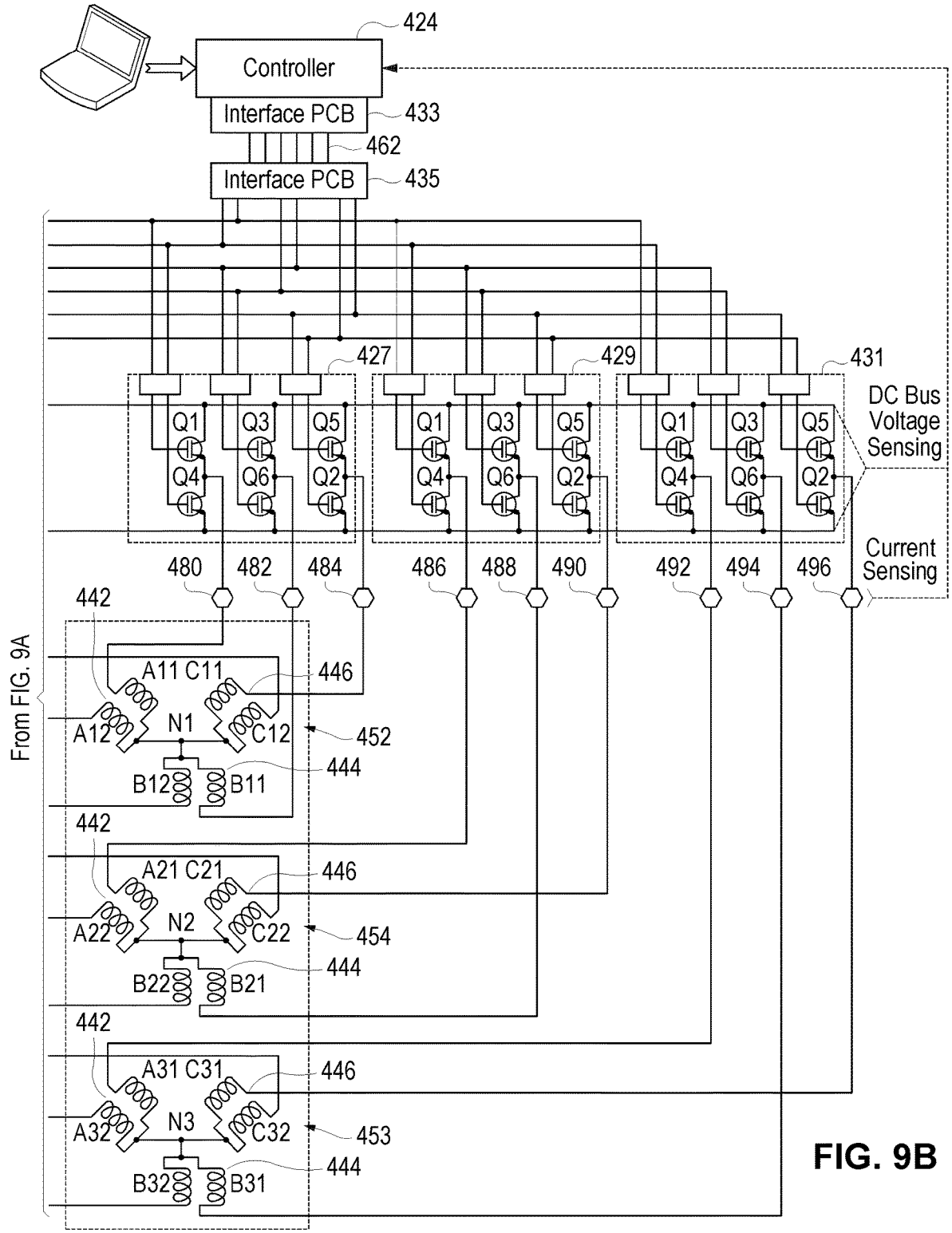

FIGS. 9A and 9B are a schematic diagram of an architecture of a motor driven propulsion system which may be an alternative to the motor driven propulsion system shown in FIG. 3. In the particular implementation of FIG. 3, conductors forming bifilar coil windings are coupled in parallel between a single ended connection with a power converter circuit and a neutral node. For example, conductors for coil winding 342 (A11/A12) of set of coil windings 352 are coupled in parallel between power converter circuit 322 first leg output and neutral node N1. Similarly, conductors for coil winding 344 (B11/B12) of set of coil windings 352 are coupled in parallel between power converter circuit 322 second leg output and neutral node N1. Likewise, conductors for coil winding 346 (C11/C12) of set of coil windings 352 are coupled in parallel between power converter circuit 322 third leg output and neutral node N1.

In the implementation of FIGS. 9A and 9B, independently controllable power converter circuits 422 and 431 are dedicated to providing current to set of coil windings 456, independently controllable power converter circuits 423 and 429 are dedicated to providing current to set of coil windings 454 and independently controllable power converter circuits 425 and 427 are dedicated to providing to current to set of coil windings 452. Here, conductors forming bifilar coil windings may be coupled together at a neutral node and coupled to terminals of separate power converter circuits. For example, conductors for coil winding 442 (A11/A12) of set of coil windings 452 are coupled together at a neutral node N1 and to separate power converter circuits 425 and 427 first leg output. Similarly, conductors for coil winding 444 (B11/B12) of set of coil windings 452 are coupled together at neutral node N2 and to separate power converter circuits 425 and 427 second leg output. Likewise, conductors for coil winding 446 (C11/C12) of set of coil windings 452 are coupled together at neutral node N3 and to separate power converter circuits 425 and 427 third leg output. In the particular implementation of FIG. 4, using two different power converter circuits (e.g., instead of using a single power converter circuit as shown in FIG. 3) to supply a PWM waveform signal to different conductors of a bifilar coil winding may enable further cancelation of high frequency noise arising from ripple at high frequency switching.

In the particular implementation of FIGS. 9A and 9B, coil windings of a set of coil windings may receive a PWM waveform signal (e.g., such as PWM waveform signals shown in FIGS. 4A, 4B and 4C) from two power converter circuits dedicated to provide the PWM waveform signal to the set of coil windings. For example, power converter circuits 425 and 427 may be dedicated to provide PWM waveform signals to set of coil windings 452 of a particular motor segment. For example, IGBTs Q1 and Q4 of power converter circuit 427 may control a PWM waveform provided to portion A11 and IGBTs Q1 and Q4 of power converter circuit 425 may control a PWM waveform provided to portion A12. Similarly, IGBTs Q3 and Q6 of power converter circuit 427 may control a PWM waveform provided to portion B11 and IGBTs Q3 and Q6 of power converter circuit 425 may control a PWM waveform provided to portion B12. Also, IGBTs Q5 and Q2 of power converter circuit 427 may control a PWM waveform provided to portion C11 and IGBTs Q5 and Q2 of power converter circuit 425 may control a PWM waveform provided to portion C12.

According to an embodiment, controller 424 may control timing of a PWM waveform signal provided to sets of coil windings 452, 454 and 456 based, at least in part, on measurements of current signal obtained by current sensors 462 through 496. For example, controller 424 may provide control signals to independently controllable power converter circuits 422, 423, 425, 427, 429 and 431 through interfaces 433 and 435, and fiber optic cables or bus 462. As discussed above, controller 424 may control a timing of voltage waveform signals provided to coil windings 442 (e.g., as shown in FIG. 4A) of sets of coil windings 452, 454 and 456 so as to minimize or eliminate a phase of a fundamental period of a current signal (e.g., $FP_A$ as shown in FIG. 4D) between or among coil windings 442 of sets of coil windings 452, 454 and 456. Similarly, controller 424 may control a timing of voltage waveform signals provided to coil windings 444 (e.g., as shown in FIG. 4B) of sets of coil windings 452, 454 and 456 so as to minimize or eliminate a phase of a fundamental period of a current signal (e.g., $FP_B$ as shown in FIG. 4E) between or among coil windings 444 of sets of coil windings 452, 454 and 456. Likewise, controller 424 may control a timing of voltage waveform signals provided to coil windings 446 (e.g., as shown in FIG. 4C) of sets of coil windings 452, 454 and 456 so as to minimize or eliminate a phase of a fundamental period of a current signal (e.g., $FP_C$ as shown in FIG. 4F) between or among coil windings 446 of sets of coil windings 452, 454 and 456.

As pointed out above in the particular implementation of FIGS. 9A and 9B, conductors for coil windings in a set of coil windings are coupled to a single neutral node. For example, conductors for coil windings of set of coil windings 452 are coupled to neutral node N1, conductors for coil windings of set of coil windings 454 are coupled to neutral node N2 and conductors for coil windings of set of coil windings 456 are coupled to neutral node N3. In the alternative implementation of FIGS. 10A and 10B, conductors for coil windings for a set of coil windings may be coupled to two separate neutral nodes. For example, conductors A11, B11 and C11 of coil winding 452 are coupled to neutral node N11 while conductors A12, B12 and C12 of coil winding 452 are coupled to neutral node N12. Similarly, conductors A21, B21 and C21 of coil winding 454 are coupled to neutral node N21 while conductors A22, B22 and C22 of coil winding 454 are coupled to neutral node N22. Likewise, conductors A31, B31 and C31 of coil winding 454 are coupled to neutral node N31 while conductors A32, B32 and C32 of coil winding 454 are coupled to neutral node N32.

Figure 8:
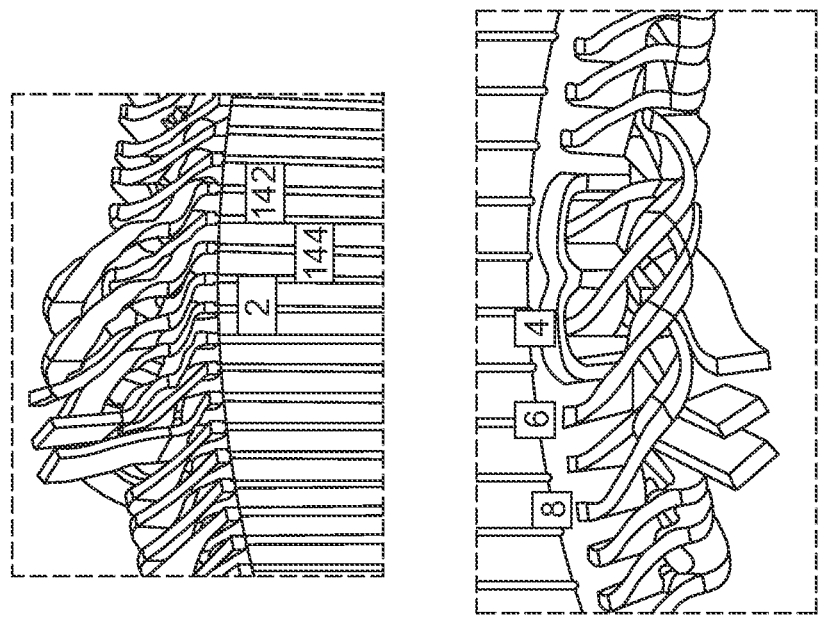
FIG. 8 is a diagram showing a detail of a stator according to an embodiment.
Figure 8:
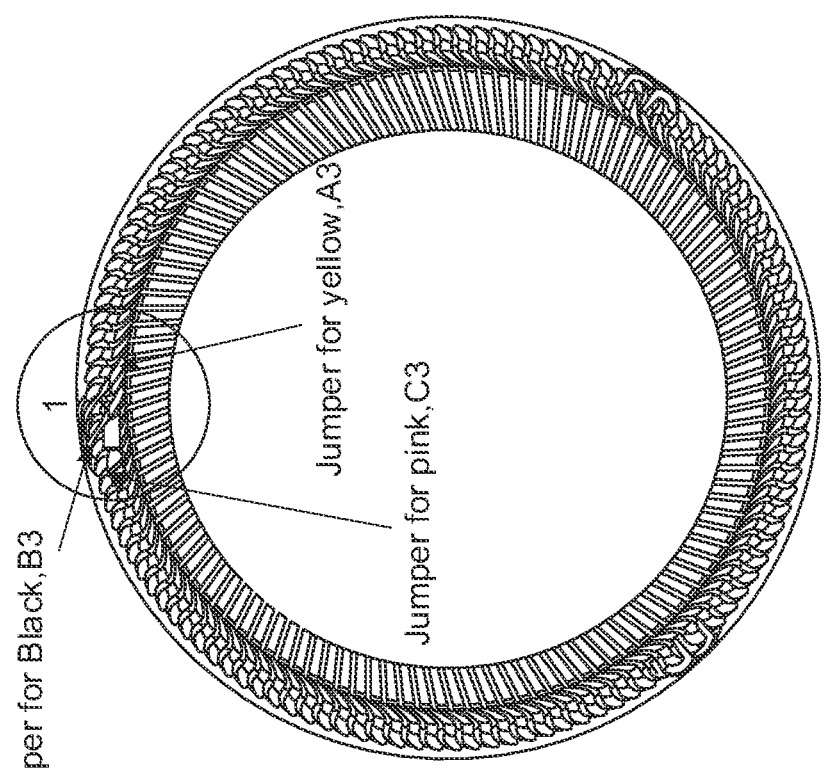
Figure 10A:
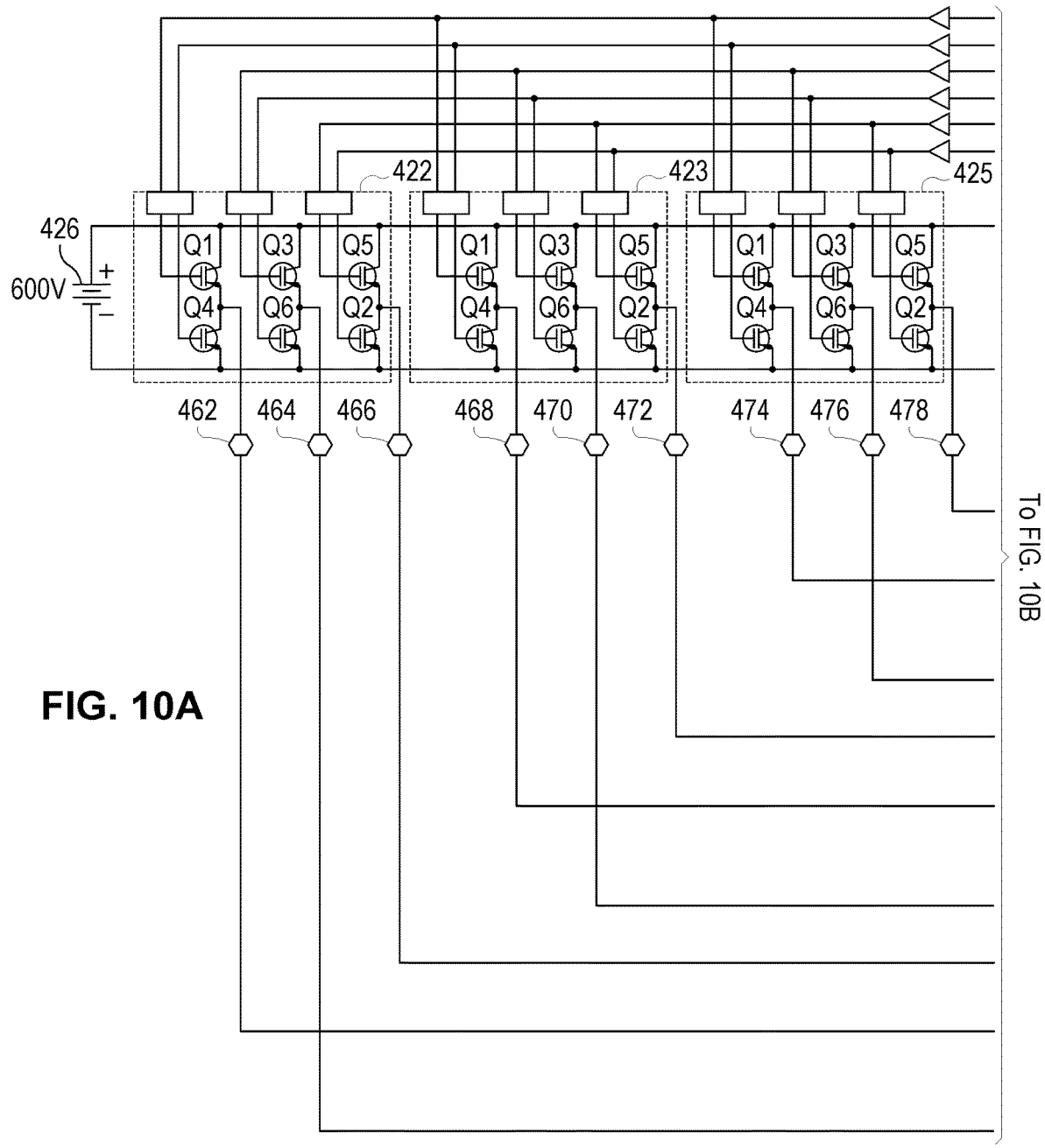
Figure 10B:
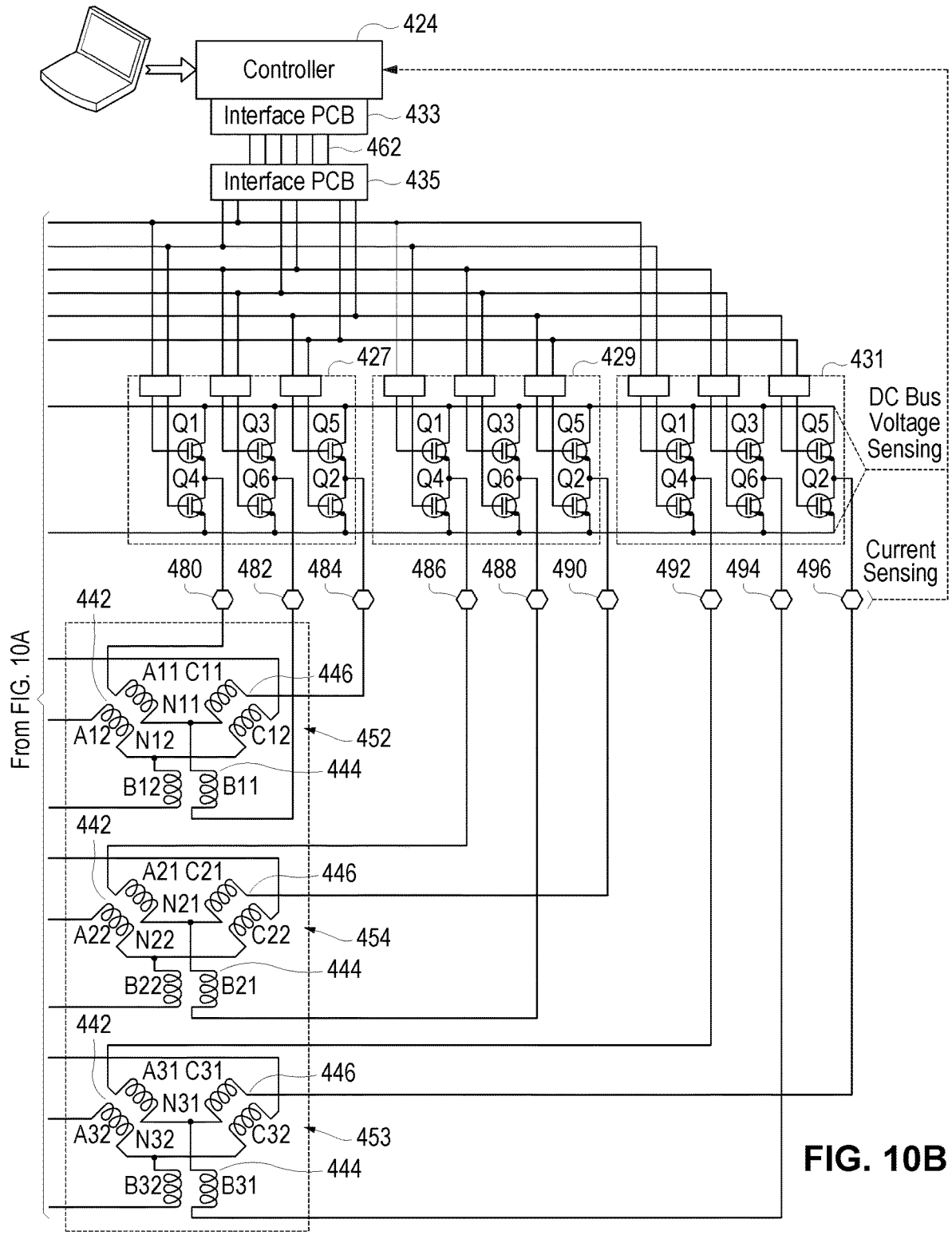
Figures 11, 12:
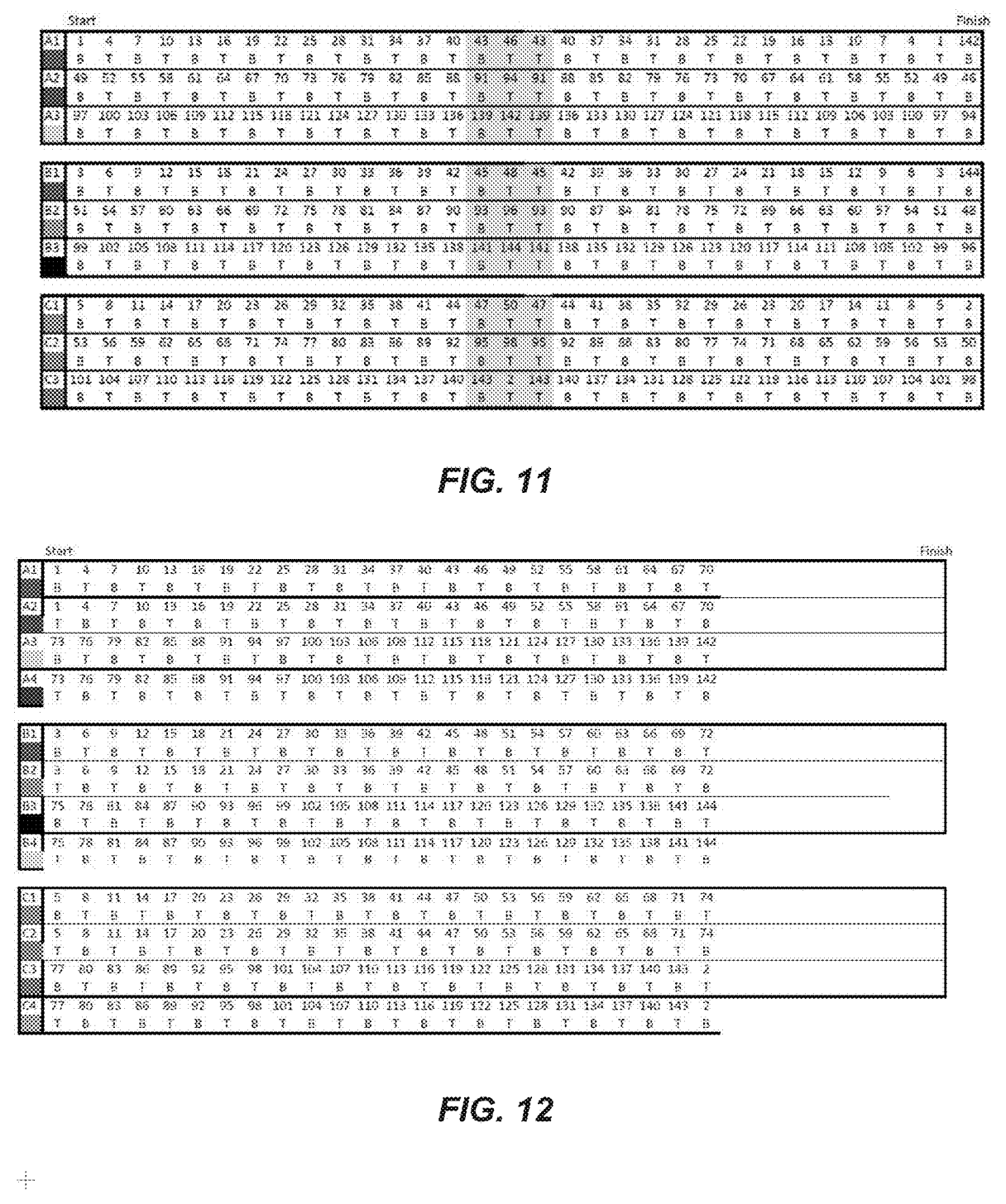

In the particular implementation of FIGS. 7A through 8, a set of coil windings (e.g., a set of coil windings formed by cables A1, B1 and C1) may cover 240° portion of a stator core. In an alternative implementation as illustrated in FIG. 11, a set of coil windings may cover a 120° portion of a stator core comprising 144 slots and have sixteen poles. FIG. 11 shows a mapping of cables A1, B1 and C1 to top and bottom portions of slots in a range of slot 142 through slot 50, a mapping of cables A2, B2 and C2 to top and bottom portions of slots in a range from slot 94 through slot 144, and a mapping of cables A3, B3 and C3 to top and bottom portions of slots in a range slot 46 through slot 98. In an embodiment, cables A1, B1, C1, A2, B2, C2, A3, B3 and C3 may each comprise side by side conductors of type 8 Litz wires to enable formation of bifilar coil windings (e.g., A1 to form A11/A12, A2 to form A21/A22, A3 to form A31/A32, B1 to form B11/B12, B2 to form B21/B22, B3 to form B31/B32, C1 to form C11/C12, C2 to form C21/C22 and C3 to form C31/C32). In an implementation, there is one turn per coil with roughly two coils per pole with a double back at a coil pitch. For example, cables A1, B1 and C1 double back at slots 46, 48 and 50, respectively, cables A2, B2 and C2 double back at slots 94, 96 and 98, respectively, and cables A3, B3 and C3 double back at slots 142, 144 and 2, respectively. Cables at the "start" slot (e.g., slot 1 for cable A1, slot 49 for cable A2, slot 97 for cable A3, slot 1 for cable A1, slot 49 for cable A2, slot 97 for cable A3, slot 1 for cable A1, slot 49 for cable A2 and slot 97 for cable A) may be coupled to neutral nodes. In one implementation as illustrated in FIGS. 9A and 9B, conductors for cables A1, B1 and C1 may be coupled together at a single neutral node N1, conductors for cables A2, B2 and C2 may be coupled together at a single neutral node N2 and conductors for cables A3, B3 and C3 may be coupled together at a single neutral node N3. In an alternative implementation, different conductors of a cable may be coupled to different neutral nodes. For example, as illustrated in FIGS. 10A and 10B, conductors A11, B11 and C11 may be coupled to a neutral node N11 while conductors A12, B12 and C12 may be coupled to a neutral node N12. Similarly, conductors A21, B21 and C21 may be coupled to a neutral node N21 while conductors A22, B22 and C22 may be coupled to a neutral node N12. Likewise, conductors A31, B31 and C31 may be coupled to a neutral node N31 while conductors A32, B32 and C32 may be coupled to a neutral node N32. In an embodiment, and as discussed above in connection with the embodiment of FIG. 3, cables A1, B1 and C1 may be formed as a set of coil windings powered by a first independently controllable power converter circuit, cables A2, B2 and C2 may be formed as a set of coil windings powered by a second independently controllable power converter circuit, and cables A3, B3 and C3 may be formed as a set of coil windings powered by a third independently controllable power converter circuit.

In another alternative implementation as illustrated in FIG. 12, four sets of coil windings may be formed by twelve cables wherein each set of coil windings covers a 180° portion of a slot stator comprising 24 poles. A first set of coil windings may be formed by cables A1, B1 and C1, a second set of coil windings formed by cables A2, B2 and C2, a third set of coil windings formed by cables A3, B3 and C3, and a fourth set of coil windings formed by cables A4, B4 and C4. Like the embodiment of FIG. 11, each of the twelve cables may comprise a pair of side-by-side conductors of type 8 Litz wire (e.g., such that cable A1 comprises conductors A11 and A12) to form bifilar coil windings.

As shown in FIG. 12, pairs of cables may occupy top and bottom portions of the same slots in alternating fashion. For example, cables A1 and A2 occupy the same slots in alternating top and bottom portions (e.g., alternating top and bottom portions of slots 1, 4, 7, etc.), cables A3 and A4 occupy the same slots in alternating top and bottom portions (e.g., alternating top and bottom portions of slots 73, 76, 79, etc.), cables B1 and B2 occupy the same slots in alternating top and bottom portions (e.g., alternating top and bottom portions of slots 3, 6, 9, etc.), cables B3 and B4 occupy the same slots in alternating top and bottom portions (e.g., alternating top and bottom portions of slots 75, 78, 81, etc.), cables C1 and C2 occupy the same slots in alternating top and bottom portions (e.g., alternating top and bottom portions of slots 5, 8, 11, etc.), and cables C3 and C4 occupy the same slots in alternating top and bottom portions (e.g., alternating top and bottom portions of slots 77, 80, 83, etc.).

Cables at the "start" slot (e.g., slot 1 for cables A1 and A2, slot 73 for cables A3 and A3, slot 3 for cables B1 and B2, slot 75 for cables B3 and B4, slot 5 for cables C1 and C2, and slot 77 for cables C3 and C4) A2, slot 97 for cable A3, slot 1 for cable A1, slot 49 for cable A2, slot 97 for cable A3, slot 1 for cable A1, slot 49 for cable A2 and slot 97 for cable A). According to an embodiment, four distinct and isolated neutral connections may be formed by coupling conductors of cables A1, B1 and C1 to a first neutral connection, coupling conductors of cables A2, B2 and C2 to a second neutral connection, coupling conductors of cables A3, B3 and C3 to a third neutral connection, and coupling conductors of cables A4, B4 and C4 to a fourth neutral connection. may be coupled to neutral nodes. In one implementation as illustrated in FIGS. 9A and 9B, conductors for cables A1, B1 and C1 may be coupled together at a single neutral node N1, conductors for cables A2, B2 and C2 may be coupled together at a single neutral node N2 and conductors for cables A3, B3 and C3 may be coupled together at a single neutral node N3. In an embodiment, cables A1, B1 and C1 may be formed as a set of coil windings powered by a first power converter circuit, cables A2, B2 and C2 may be formed as a set of coil windings powered by a second power converter circuit, cables A3, B3 and C3 may be formed as a set of coil windings powered by a third independently controllable power converter circuit, and cables A4, B4 and C4 may be formed as a set of coil windings powered by a fourth independently controllable power converter circuit.

According to an embodiment, different mappings of cables to stator slots as expressed in FIGS. 7B, 11 and 12 may realize different levels of magnetic coupling between or among coil windings powered by different power converter circuits. A particular level of magnetic coupling between or among coil windings powered by different power converter circuits may be desired based on particular design objectives or constraints. In the particular implementation of FIG. 7B, each coil winding powered by a first power converter circuit is magnetic coupled with two coil windings powered by different independently controllable power converter circuits. For example, a first 120° portion of the coil winding powered by the first coil winding overlaps slot for slot with a coil winding powered by a second independently controllable power converter circuit and a second 120° portion of the coil winding powered by the first coil winding overlaps slot for slot with a coil winding powered by a third independently controllable power converter circuit. Here, coil windings powered by different independently controllable power converter circuits occupying the same slots are tightly magnetically coupled. Likewise, in the particular implementation of FIG. 12, a coil winding powered by a first independently controllable power converter circuit overlaps slot for slot with a coil winding powered by a second power converter circuit over 180° of a stator core. In the particular implementation of FIG. 11, on the other hand, a coil winding powered by a single independently controllable power converter circuit and covering 120° portion of a stator core occupies top and bottom portions of thirty-two particular slots over the 120° portion. Accordingly, coil windings from the same phase (e.g., phase A, B or C) in this implementation may be magnetically decoupled.

In the particular implementations of FIGS. 5A and 5B, coil windings are formed by wrapping cables in slots between teeth extending from an inner surface of a stator core (e.g., teeth 202 formed on an inner surface of stator core 200). In an alternative implementation, cables may be wrapped to a stator core having no such teeth extending from an inner surface of the stator core (in the absence of teeth) to form so-called "air-gap" coil windings. For example, cables may be wrapped adjacently together by being disposed in layers positioned on an inner surface of a stator core. Cables wrapped to an inner surface of the stator core having no teeth may be positioned and separated by spacers. It should be understood, however, that this is merely an example of how cables may be positioned on an inner surface of a stator core to form air-gap coil windings, and claimed subject matter is not limited in this respect. In particular embodiments, cables may be wrapped to a stator core to form air-gap coil winding according to mappings shown in FIGS. 7B, 11 and 12. For example, cables may be wrapped in top and bottom layers set off by spacers instead of stator teeth extending from an inner surface of a stator core.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A device comprising:
   a power bus;
   a stator core;
   a rotor disposed within the stator core;
   a plurality of power converter circuits coupled to the power bus; and
   a plurality of first cables coupled to a first power converter circuit of the plurality of power converter circuits and wrapped to a first portion of the stator core to form at least a first portion of one or more coil windings;
   a plurality of second cables coupled to a second power converter circuit of the plurality of power converter circuits and wrapped to a second portion of the stator core to form at least a second portion of the one or more coil windings, the first portion of the stator core and the second portion of the stator core overlapping on a first overlapped portion of the stator core; and
   a plurality of third cables coupled to a third power converter circuit of the plurality of power converter circuits, wherein:
   at least one of the first cables and at least one of the second cables are wrapped adjacently together in intimate proximity over the first overlapped portion of the stator core and in a same winding path over one or more stator teeth of the stator core;
   the first power converter circuit is adaptable to provide a first voltage waveform signal to the at least one of the first cables and the second power converter circuit is adaptable to provide a second voltage waveform signal to the at least one of the second cables, the first and second voltage waveform signals being substantially identical so as to constructively induce a first combined magnetic flux to at least a first one of the one or more stator teeth;
   the at least one of the third cables is wrapped to a third portion of the stator core, the second portion of the stator core and the third portion of the stator core overlapping on a second overlapped portion of the stator core, wherein the at least one of the second cables and the at least one of the third cables are wrapped adjacently together in intimate proximity over the second overlapped portion of the stator core; and
   the third power converter circuit is adaptable to provide a third voltage waveform signal to the at least one of the third cables that is substantially identical to the first and second voltage waveform signals such that currents in the at least one of the second cables and the at least one of the third cables constructively induce a second combined magnetic flux to at least a second one of the one or more stator teeth.

2. The device of claim 1, wherein the stator core comprises a plurality of stator teeth, wherein the at least one of the first cables and the at least one of the second cables are wrapped adjacently together to at least some slots between stator teeth in a winding path over the first overlapped portion of the stator core, wherein the at least one of the second cables and the at least one of the third cables are wrapped adjacently together to at least some slots between stator teeth over the second overlapped portion of the stator core, and wherein the at least one of the first cables and the at least one of the third cables are wrapped adjacently together to at least some slots between stator teeth over a third overlapped portion of the stator core.

3. The device of claim 2, wherein the at least some slots formed between stator core over the first overlapped portion comprise top and bottom portions, and wherein the at least one of the first cables and the at least one of the second cables alternate between occupying top and bottom portions of the at least some slots formed between stator teeth over the first overlapped portion of the stator core.

4. The device of claim 2, wherein the first portion of the stator core comprises a first 240° portion of the stator core, the second portion of the stator core comprises a second 240° portion of the stator core and the third portion of the stator core a third 240° portion of the stator core, and wherein an overlap of the first 240° portion and the second 240° comprises the first overlapped portion of the stator core, an overlap of the second 240° portion and the third 240° portion comprises the second overlapped portion of the stator core, and an overlap of the first 240° portion and the third 240° portion comprises the third overlapped portion of the stator core.

5. The device of claim 1, and further comprising a controller to provide timing signals to each power converter circuit synchronized to a single clock signal, and wherein the power converter circuits are further configured to apply synchronized pulse width modulation (PWM) waveform signals to the first, second and third cables powered by the power bus according to the timing signals.

6. The device of claim 5, wherein the PWM waveform signals have a fundamental frequency of about 1200 Hz.

7. The device of claim 1, wherein the power bus provides a voltage waveform less than 700V DC.

8. The device of claim 1, wherein each of the plurality of first cables and each of the plurality of second cables comprise a plurality of electrically isolated 20 AWG conductors.

9. The device of claim 1, and further comprising:
one or more current sensors to measure a first current signal in the at least one of the first cables responsive to the first voltage waveform signal and a second current signal in the at least one of the second cables responsive to the second voltage waveform signal; and
a controller to affect timing of the first and second voltage waveform signals so as to reduce or minimize a phase between fundamental periods of the first current signal and the second current signal.

10. A method comprising:
applying a first voltage waveform signal, from a first power converter circuit, to at least one cable of a plurality of first cables connected to the first power converter circuit, the at least one cable of the first cables being wrapped to a first portion of a stator core to form at least a first portion of one or more coil windings;
applying a second voltage waveform signal, from a second power converter circuit, to at least one cable of a plurality of second cables connected to the second power converter circuit, the at least one of the second cables being wrapped to a second portion of the stator core to form at least a second portion of the one or more coil windings, the first and second portions of the stator core overlapping on a first overlapped portion of the stator core; and
applying a third voltage waveform signal, from a third power converter circuit,
wherein:
the at least one of the first cables and the at least one of the second cables are wrapped adjacently together in intimate proximity over the first overlapped portion of the stator core and in a same winding path over one or more stator teeth of the stator core;
the first and second voltage waveform signals are substantially identical so as to constructively induce a first combined magnetic flux to at least a first one of the one or more stator teeth;
at least one of a plurality of third cables is wrapped to a third portion of the stator core, the second portion of the stator core and the third portion of the stator core overlapping on a second overlapped portion of the stator core, wherein the at least one of the plurality of second cables and the at least one of the third cables are wrapped adjacently together in intimate proximity over the second overlapped portion of the stator core; and
the third voltage waveform signal is substantially identical to the first and second voltage waveform signals such that currents in the at least one of the second plurality of cables and the at least one of the third cables constructively induce a second combined magnetic flux to at least a second one of the one or more stator teeth.

11. The method of claim 10, wherein the stator core comprises a plurality of stator teeth, wherein the at least one of the first plurality of first cables and the at least one of the second cables are wrapped together in a winding path over at least some slots formed between stator teeth over the first overlapped portion of the stator core, wherein the at least one of the second cables and the at least one of the third cables are wrapped together to at least some slots formed between stator teeth over the second overlapped portion of the stator core, and wherein the at least one of the first cables and the at least one of the third cables are wrapped together adjacently over at least some slots formed between stator teeth over a third overlapped portion of the stator core.

12. The method of claim 11, wherein the slots formed between stator teeth over the first overlapped portion comprise top and bottom portions, and wherein the at least one of the first cables and the at least one of the second cables alternate between occupying top and bottom portions of the at least some slots formed between stator teeth over the first overlapped portion of the stator core.

13. The method of claim 11, wherein the first portion of the stator core comprises a first 240° portion of the stator core, the second portion of the stator core comprises a second 240° portion of the stator core and the third portion of the stator core a third 240° portion of the stator core, and wherein an overlap of the first 240° portion and the second 240° comprises the first overlapped portion of the stator core, an overlap of the second 240° portion and the third 240° portion comprises the second overlapped portion of the stator core, and an overlap of the first 240° portion and the third 240° portion comprises the third overlapped portion of the stator core.

14. The method of claim 10, and further comprising providing timing signals to each power converter circuit synchronized to a single clock signal, and wherein the power converter circuits are further configured to apply synchronized pulse width modulation (PWM) waveform signals to the first, second and third cables powered by a power bus according to the timing signals.

15. The method of claim 10, and further comprising generating the first and second voltage waveform signals from a power bus of less than 700V DC.

16. The method of claim 10, wherein each of the first cables and each of the plurality of second cables comprise a plurality of electrically isolated 20 AWG conductors.

17. The method of claim 10, and further comprising:
obtaining one or more measurements of a first current signal in the at least one of the first cables responsive to the first voltage waveform signal;
obtaining one or more measurements of a second current signal in the at least one of the second cables responsive to the second voltage waveform signal; and
affecting timing of the first and second voltage waveform signals so as to reduce or minimize a phase between fundamental periods of the first current signal and the second current signal based, at least in part, on the one or more measurements of the first current signal and the one or more measurements of the second current signal.

* * * * *